US012641598B2

(12) United States Patent
Shah et al.

(10) Patent No.: US 12,641,598 B2
(45) Date of Patent: May 26, 2026

(54) ORTHOGONAL COVER CODES FOR UPLINK TRANSMISSIONS

(71) Applicant: QUALCOMM Incorporated, San Diego, CA (US)

(72) Inventors: Syed Hashim Ali Shah, San Diego, CA (US); Alberto Rico Alvarino, San Diego, CA (US); Xiao Feng Wang, San Diego, CA (US); Liangping Ma, San Diego, CA (US); Ayan Sengupta, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 306 days.

(21) Appl. No.: 18/472,690

(22) Filed: Sep. 22, 2023

(65) Prior Publication Data

US 2025/0106841 A1    Mar. 27, 2025

(51) Int. Cl.
*H04W 72/1268* (2023.01)
*H04L 5/00* (2006.01)

(52) U.S. Cl.
CPC ....... *H04W 72/1268* (2013.01); *H04L 5/0053* (2013.01); *H04L 5/0094* (2013.01)

(58) Field of Classification Search
CPC ............. H04W 72/1268; H04W 72/23; H04L 5/0053; H04L 5/0094; H04L 5/0016; H04L 5/0044; H04L 1/1671; H04L 5/0005; H04J 11/0023
See application file for complete search history.

(56) References Cited

U.S. PATENT DOCUMENTS

| | | | |
|---|---|---|---|
| 2012/0014320 A1* | 1/2012 | Nam ..................... | H04L 1/1671 |
| | | | 370/328 |
| 2012/0281656 A1* | 11/2012 | Hooli .................. | H04J 11/0023 |
| | | | 370/328 |
| 2021/0014095 A1* | 1/2021 | Ly .......................... | H04W 72/23 |
| 2021/0044981 A1* | 2/2021 | Bhattad ................ | H04W 72/23 |
| 2021/0320762 A1* | 10/2021 | Huang ................. | H04L 5/0005 |
| 2022/0303988 A1* | 9/2022 | Yi ......................... | H04L 5/0044 |

OTHER PUBLICATIONS

Co-pending U.S. Appl. No. 18/472,701, filed Sep. 22, 2023.
Co-pending U.S. Appl. No. 18/473,112, filed Sep. 22, 2023.
Co-pending U.S. Appl. No. 18/473,114, filed Sep. 22, 2023.

* cited by examiner

*Primary Examiner* — Vinncelas Louis
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration associated with an orthogonal cover code (OCC), wherein the configuration indicates a multiplexing order, an OCC codeword for multiplexing, and a type of OCC, and the type of OCC is one of: frequency domain OCC (FD-OCC), time domain OCC (TD-OCC), sub physical resource block (sub-PRB) OCC, or sub-slot OCC. The UE may apply, based at least in part on the configuration, the OCC to an uplink transmission. The UE may transmit the uplink transmission with the OCC applied based at least in part on the configuration. Numerous other aspects are described.

30 Claims, 23 Drawing Sheets

OFDM Symbol #1

| $-s_2(6,1)$ | $-s_2(5,1)$ | $-s_2(4,1)$ | $-s_2(3,1)$ | $-s_2(2,1)$ | $-s_2(1,1)$ | $s_2(6,1)$ | $s_2(5,1)$ | $s_2(4,1)$ | $s_2(3,1)$ | $s_2(2,1)$ | $s_2(1,1)$ |

UE 2

| $s_1(6,1)$ | $s_1(6,1)$ | $s_1(4,1)$ | $s_1(3,1)$ | $s_1(2,1)$ | $s_1(1,1)$ | $s_1(6,1)$ | $s_1(5,1)$ | $s_1(4,1)$ | $s_1(3,1)$ | $s_1(2,1)$ | $s_1(1,1)$ |

UE 1

[1,1]

OCC

[1,−1]

UE 2

| $s_2(6,1)$ | $s_2(5,1)$ | $s_2(4,1)$ | $s_2(3,1)$ | $s_2(2,1)$ | $s_2(1,1)$ |

| $s_1(6,1)$ | $s_1(5,1)$ | $s_1(4,1)$ | $s_1(3,1)$ | $s_1(2,1)$ | $s_1(1,1)$ |

UE 1

OFDM Symbol #1

Figure 11:
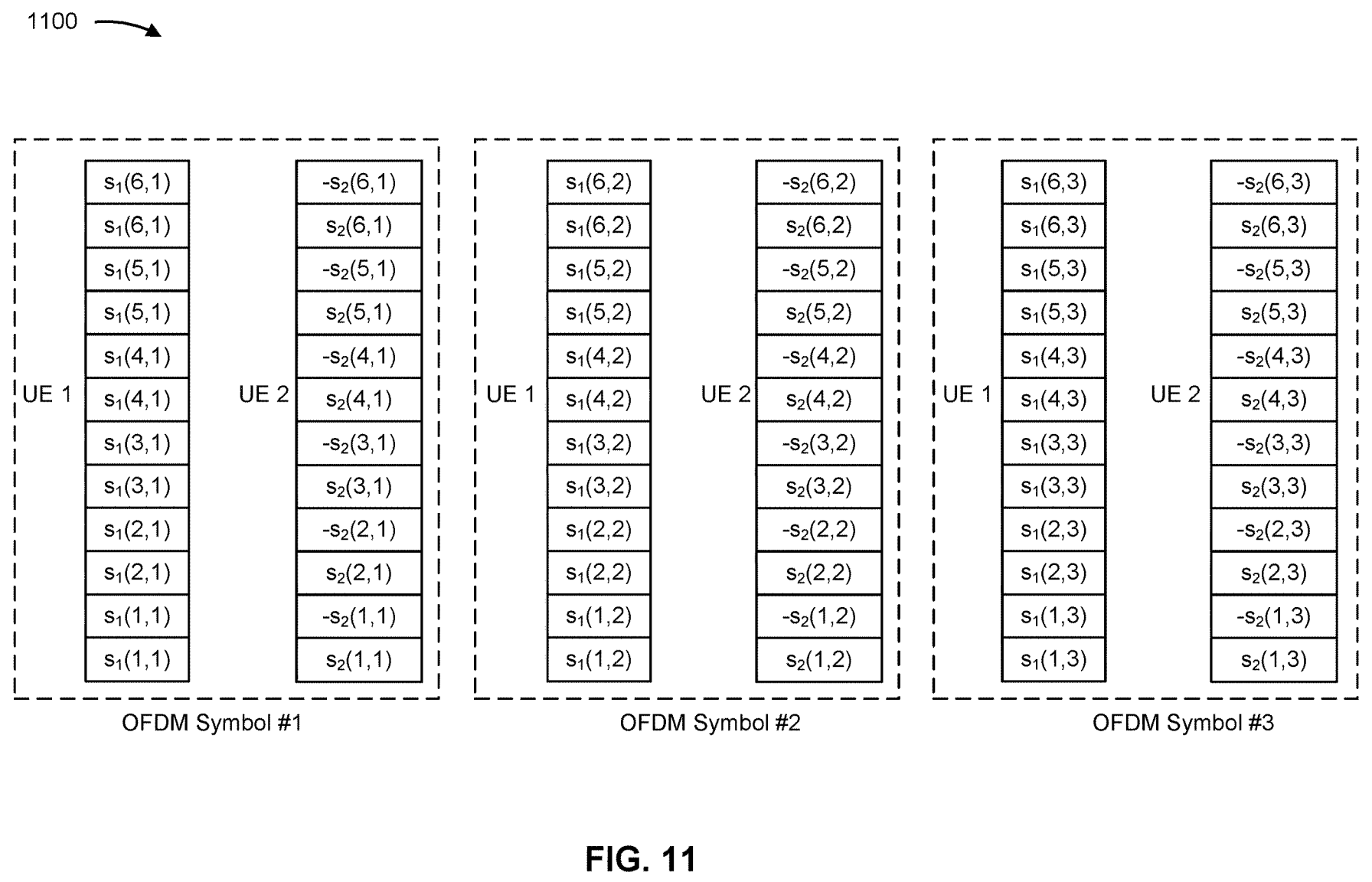

| $-s_2(6,1)$ | $s_2(6,1)$ | $-s_2(5,1)$ | $s_2(5,1)$ | $-s_2(4,1)$ | $s_2(4,1)$ | $-s_2(3,1)$ | $s_2(3,1)$ | $-s_2(2,1)$ | $s_2(2,1)$ | $-s_2(1,1)$ | $s_2(1,1)$ |

UE 2

| $s_1(6,1)$ | $s_1(6,1)$ | $s_1(5,1)$ | $s_1(5,1)$ | $s_1(4,1)$ | $s_1(4,1)$ | $s_1(3,1)$ | $s_1(3,1)$ | $s_1(2,1)$ | $s_1(2,1)$ | $s_1(1,1)$ | $s_1(1,1)$ |

UE 1

OFDM Symbol #1

| $-s_2(6,2)$ | $s_2(6,2)$ | $-s_2(5,2)$ | $s_2(5,2)$ | $-s_2(4,2)$ | $s_2(4,2)$ | $-s_2(3,2)$ | $s_2(3,2)$ | $-s_2(2,2)$ | $s_2(2,2)$ | $-s_2(1,2)$ | $s_2(1,2)$ |

UE 2

| $s_1(6,2)$ | $s_1(6,2)$ | $s_1(5,2)$ | $s_1(5,2)$ | $s_1(4,2)$ | $s_1(4,2)$ | $s_1(3,2)$ | $s_1(3,2)$ | $s_1(2,2)$ | $s_1(2,2)$ | $s_1(1,2)$ | $s_1(1,2)$ |

UE 1

OFDM Symbol #2

| $-s_2(6,3)$ | $s_2(6,3)$ | $-s_2(5,3)$ | $s_2(5,3)$ | $-s_2(4,3)$ | $s_2(4,3)$ | $-s_2(3,3)$ | $s_2(3,3)$ | $-s_2(2,3)$ | $s_2(2,3)$ | $-s_2(1,3)$ | $s_2(1,3)$ |

UE 2

| $s_1(6,3)$ | $s_1(6,3)$ | $s_1(5,3)$ | $s_1(5,3)$ | $s_1(4,3)$ | $s_1(4,3)$ | $s_1(3,3)$ | $s_1(3,3)$ | $s_1(2,3)$ | $s_1(2,3)$ | $s_1(1,3)$ | $s_1(1,3)$ |

UE 1

OFDM Symbol #3

Figure 19:
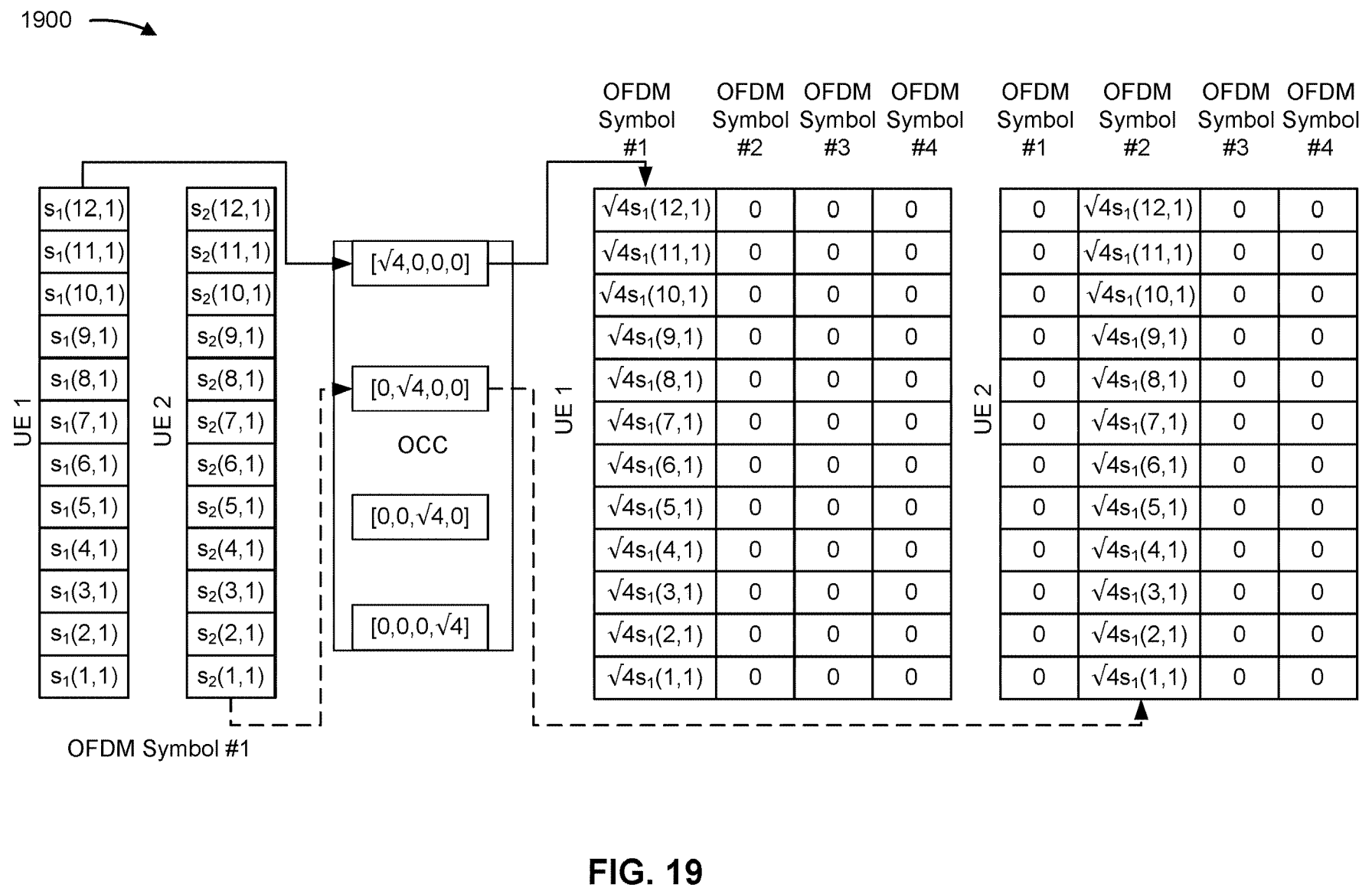

| OFDM Symbol #1 | OFDM Symbol #2 | OFDM Symbol #3 | OFDM Symbol #4 |
|---|---|---|---|
| $\sqrt{4}s_1(12,1)$ | 0 | 0 | 0 |
| $\sqrt{4}s_1(11,1)$ | 0 | 0 | 0 |
| $\sqrt{4}s_1(10,1)$ | 0 | 0 | 0 |
| $\sqrt{4}s_1(9,1)$ | 0 | 0 | 0 |
| $\sqrt{4}s_1(8,1)$ | 0 | 0 | 0 |
| $\sqrt{4}s_1(7,1)$ | 0 | 0 | 0 |
| $\sqrt{4}s_1(6,1)$ | 0 | 0 | 0 |
| $\sqrt{4}s_1(5,1)$ | 0 | 0 | 0 |
| $\sqrt{4}s_1(4,1)$ | 0 | 0 | 0 |
| $\sqrt{4}s_1(3,1)$ | 0 | 0 | 0 |
| $\sqrt{4}s_1(2,1)$ | 0 | 0 | 0 |
| $\sqrt{4}s_1(1,1)$ | 0 | 0 | 0 |

UE 2

| OFDM Symbol #1 | OFDM Symbol #2 | OFDM Symbol #3 | OFDM Symbol #4 |
|---|---|---|---|
| 0 | $\sqrt{4}s_1(12,1)$ | 0 | 0 |
| 0 | $\sqrt{4}s_1(11,1)$ | 0 | 0 |
| 0 | $\sqrt{4}s_1(10,1)$ | 0 | 0 |
| 0 | $\sqrt{4}s_1(9,1)$ | 0 | 0 |
| 0 | $\sqrt{4}s_1(8,1)$ | 0 | 0 |
| 0 | $\sqrt{4}s_1(7,1)$ | 0 | 0 |
| 0 | $\sqrt{4}s_1(6,1)$ | 0 | 0 |
| 0 | $\sqrt{4}s_1(5,1)$ | 0 | 0 |
| 0 | $\sqrt{4}s_1(4,1)$ | 0 | 0 |
| 0 | $\sqrt{4}s_1(3,1)$ | 0 | 0 |
| 0 | $\sqrt{4}s_1(2,1)$ | 0 | 0 |
| 0 | $\sqrt{4}s_1(1,1)$ | 0 | 0 |

OCC

| $[\sqrt{4},0,0,0]$ |
| $[0,\sqrt{4},0,0]$ |
| $[0,0,\sqrt{4},0]$ |
| $[0,0,0,\sqrt{4}]$ |

UE 1

| $s_1(12,1)$ |
| $s_1(11,1)$ |
| $s_1(10,1)$ |
| $s_1(9,1)$ |
| $s_1(8,1)$ |
| $s_1(7,1)$ |
| $s_1(6,1)$ |
| $s_1(5,1)$ |
| $s_1(4,1)$ |
| $s_1(3,1)$ |
| $s_1(2,1)$ |
| $s_1(1,1)$ |

UE 2

| $s_2(12,1)$ |
| $s_2(11,1)$ |
| $s_2(10,1)$ |
| $s_2(9,1)$ |
| $s_2(8,1)$ |
| $s_2(7,1)$ |
| $s_2(6,1)$ |
| $s_2(5,1)$ |
| $s_2(4,1)$ |
| $s_2(3,1)$ |
| $s_2(2,1)$ |
| $s_2(1,1)$ |

OFDM Symbol #1

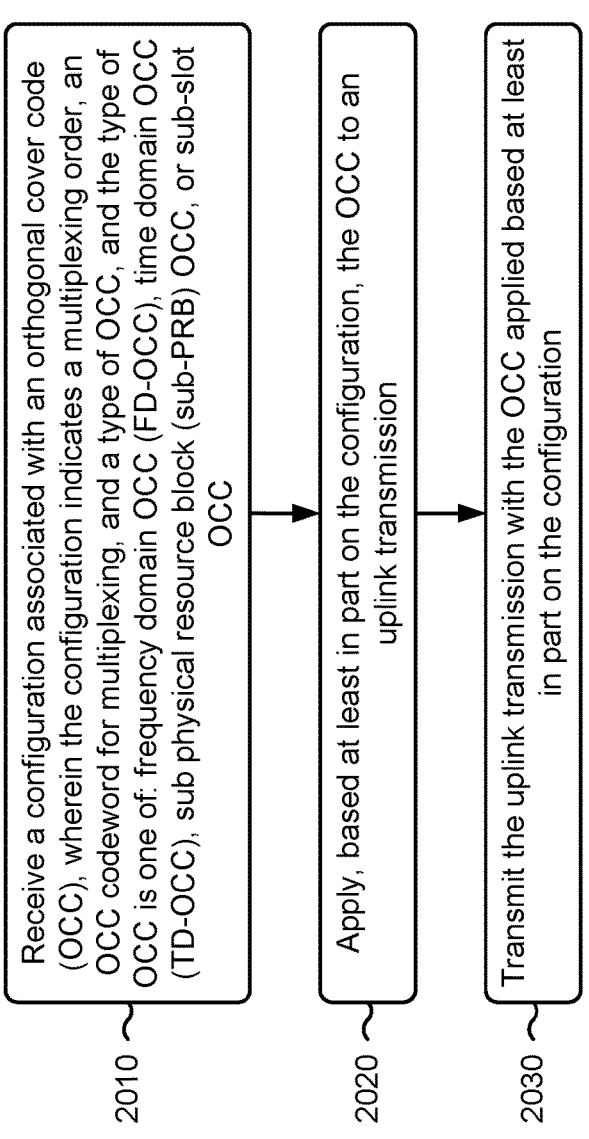

2010 Receive a configuration associated with an orthogonal cover code (OCC), wherein the configuration indicates a multiplexing order, an OCC codeword for multiplexing, and a type of OCC, and the type of OCC is one of: frequency domain OCC (FD-OCC), time domain OCC (TD-OCC), sub physical resource block (sub-PRB) OCC, or sub-slot OCC 2020 Apply, based at least in part on the configuration, the OCC to an uplink transmission 2030 Transmit the uplink transmission with the OCC applied based at least in part on the configuration

2110 Transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC 2120 Receive an uplink transmission with an OCC applied to the uplink transmission based at least in part on the configuration

2100

ORTHOGONAL COVER CODES FOR UPLINK TRANSMISSIONS

FIELD OF THE DISCLOSURE

Aspects of the present disclosure generally relate to wireless communication and to techniques and apparatuses for orthogonal cover codes (OCCs) for uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes one or more memories; and one or more processors coupled with the one or more memories and configured to cause the UE to: receive a configuration associated with an orthogonal cover code (OCC), wherein the configuration indicates a multiplexing order, an OCC codeword for multiplexing, and a type of OCC, and the type of OCC is one of: frequency domain OCC (FD-OCC), time domain OCC (TD-OCC), sub physical resource block (sub-PRB) OCC, or sub-slot OCC; apply, based at least in part on the configuration, the OCC to an uplink transmission; and transmit the uplink transmission with the OCC applied based at least in part on the configuration.

In some implementations, an apparatus for wireless communication at a network node includes one or more memories; and one or more processors coupled with the one or more memories and configured to cause the network node to: transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and receive an uplink transmission with an OCC applied to the uplink transmission based at least in part on the configuration.

In some implementations, a method of wireless communication performed by a UE) includes receiving a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; applying, based at least in part on the configuration, the OCC to an uplink transmission; and transmitting the uplink transmission with the OCC applied based at least in part on the configuration.

In some implementations, a method of wireless communication performed by a network node includes transmitting a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and receiving an uplink transmission with an OCC applied to the uplink transmission based at least in part on the configuration.

In some implementations, a non-transitory computer-readable medium storing a set of instructions for wireless communication includes one or more instructions that, when executed by one or more processors of a UE, cause the UE to: receive a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; apply, based at least in part on the configuration, the OCC to an uplink transmission; and transmit the uplink transmission with the OCC applied based at least in part on the configuration.

In some implementations, a non-transitory computer-readable medium storing a set of instructions for wireless communication includes one or more instructions that, when executed by one or more processors of a network node, cause the network node to: transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and receive an uplink transmission with an OCC applied to the uplink transmission based at least in part on the configuration.

In some implementations, an apparatus for wireless communication includes means for receiving a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; means for applying, based at least in part on the configuration, the OCC to an uplink transmission; and means for transmitting the uplink transmission with the OCC applied based at least in part on the configuration.

In some implementations, an apparatus for wireless communication includes means for transmitting a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and means for receiving an uplink transmission with an OCC applied to the uplink transmission based at least in part on the configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-19 are diagrams illustrating examples associated with OCCs for uplink transmissions, in accordance with the present disclosure.

FIGS. 20-21 are diagrams illustrating example processes associated with OCCs for uplink transmissions, in accordance with the present disclosure.

DETAILED DESCRIPTION

Figure 1:
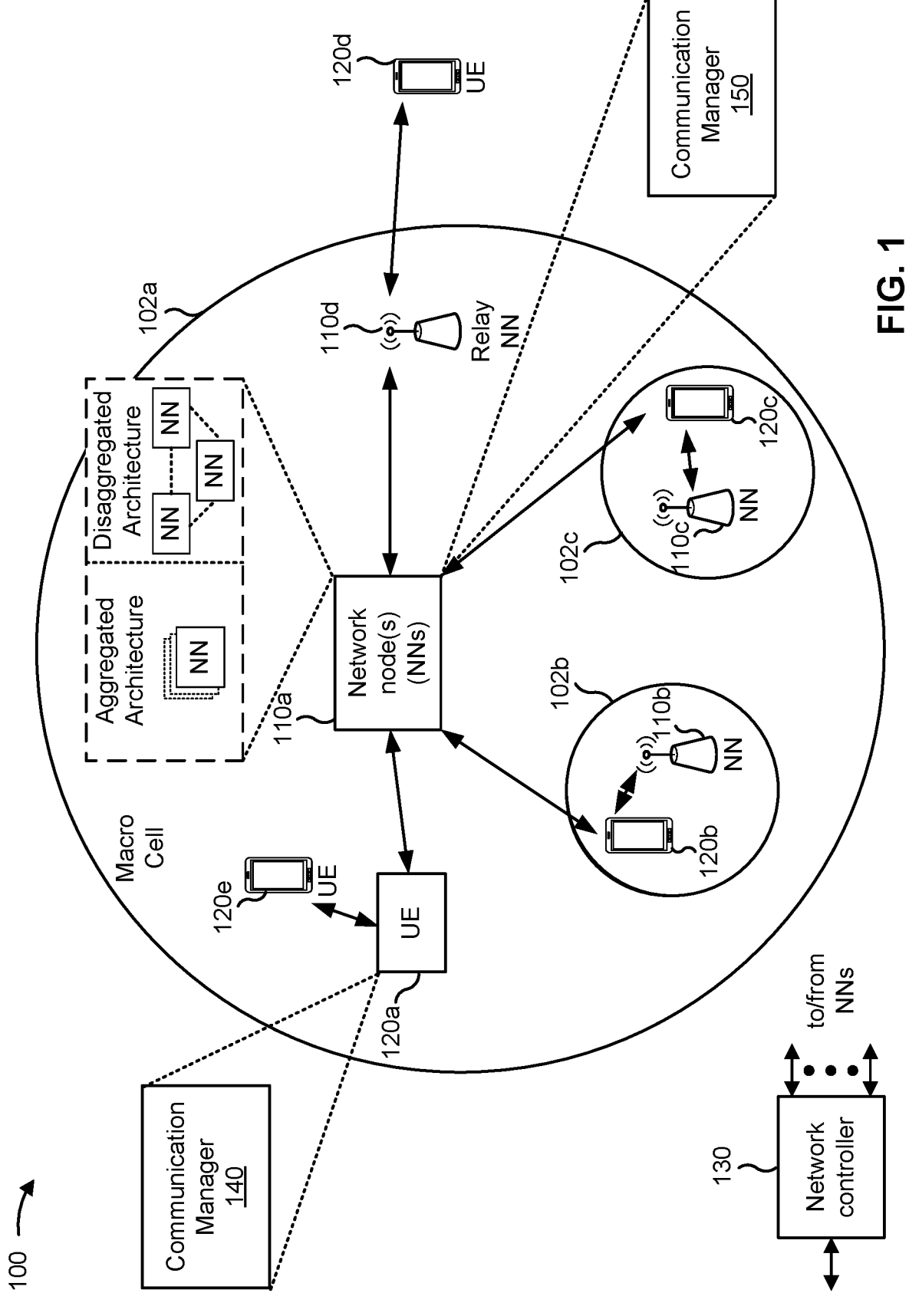
FIG. 1 is a diagram illustrating an example of a wireless network, in accordance with the present disclosure.

Multiple access schemes may be used to multiplex multiple UEs, which may increase a system capacity. Multiplexing multiple UEs may increase the system capacity because more UEs may be supported with a same amount of time-frequency resources, as compared to no multiplexing of multiple UEs. Multiplexing multiple UEs may create interference at a network node. An orthogonal cover code (OCC) (or orthogonal cover coding) may be used to mitigate the interference resulting from multiplexed multiple users. Data from UEs may be cover coded across repetitions, via transport blocks over multiple slots (TBoMS), in an orthogonal manner using the OCC. A repetition nature of uplink transmissions may allow a system to apply the OCC. An OFDM grid structure and different types of resource allocations and TBoMS associated with the OFDM grid structure may allow the OCC to be applied, using various techniques.

However, a UE may not be configured to apply OCC with TBoMS. The UE may not be configured to apply various schemes of OCC in a frequency domain and/or in a time domain. As a result, multiple access schemes may be unable to be used to multiplex multiple UEs. An inability to apply OCC to effectively mitigate interference may degrade an overall system performance. For example, interference at a network node caused by multiplexing multiple UEs may not be resolved when OCC cannot be applied, which may degrade the overall system performance.

Various aspects relate generally to OCCs for uplink transmissions. Some aspects more specifically relate to configuring OCC with TBoMS for uplink transmissions using various OCC schemes. The OCC may be associated with a repetition-based transmission (e.g., an uplink transmission that is repetition based). Alternatively, the OCC may be associated with a non-repetition-based transmission, as long as sufficient time and frequency resources are present to perform the OCC with some degree of reliability. In some examples, a UE may receive, from a network node, a configuration associated with an OCC. The configuration may indicate a multiplexing order M, an OCC codeword for multiplexing, and a type of OCC. The type of OCC may include frequency domain OCC (FD-OCC), time domain OCC (TD-OCC), sub physical resource block (PRB) (sub-PRB) OCC, or sub-slot OCC. The UE may apply, based at least in part on the configuration, the OCC to an uplink transmission. The UE may transmit, to the network node, the uplink transmission with the OCC applied based at least in part on the configuration. The network node may be associated with a terrestrial network or a non-terrestrial network (NTN).

Particular aspects of the subject matter described in this disclosure can be implemented to realize one or more of the following potential advantages. In some examples, by configuring the UE with various OCC schemes with TBoMS, the described techniques can be used to support OCCs for mitigating interference at the network node. The OCCs may mitigate the interference, which may be a result of using multiple access schemes to multiplex multiple UEs for increasing a system capacity. When the UE is configured with an ability to apply various schemes of OCC (e.g., FD-OCC, TD-OCC, sub-PRB OCC, or sub-slot OCC), the interference at the network node may be reduced, which may improve an overall system performance. The various schemes of OCC may allow multiple UEs to be multiplexed without causing interference to the network node. As a number of UEs served by a specific set of uplink carriers are increased, repetitions along with OCC in a time domain and/or frequency domain may be employed to improve the overall system performance.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; apply, based at least in part on the configuration, the OCC to an uplink transmission; and transmit the uplink transmission with the OCC applied based at least in part on the configuration. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and receive an uplink transmission with an OCC applied to the uplink transmission based at least in part on the configuration. Additionally, or alternatively, the communication manager 150 may perform one or more other operations described herein.

As indicated above, FIG. 1 is provided as an example. Other examples may differ from what is described with regard to FIG. 1.

Figure 2:
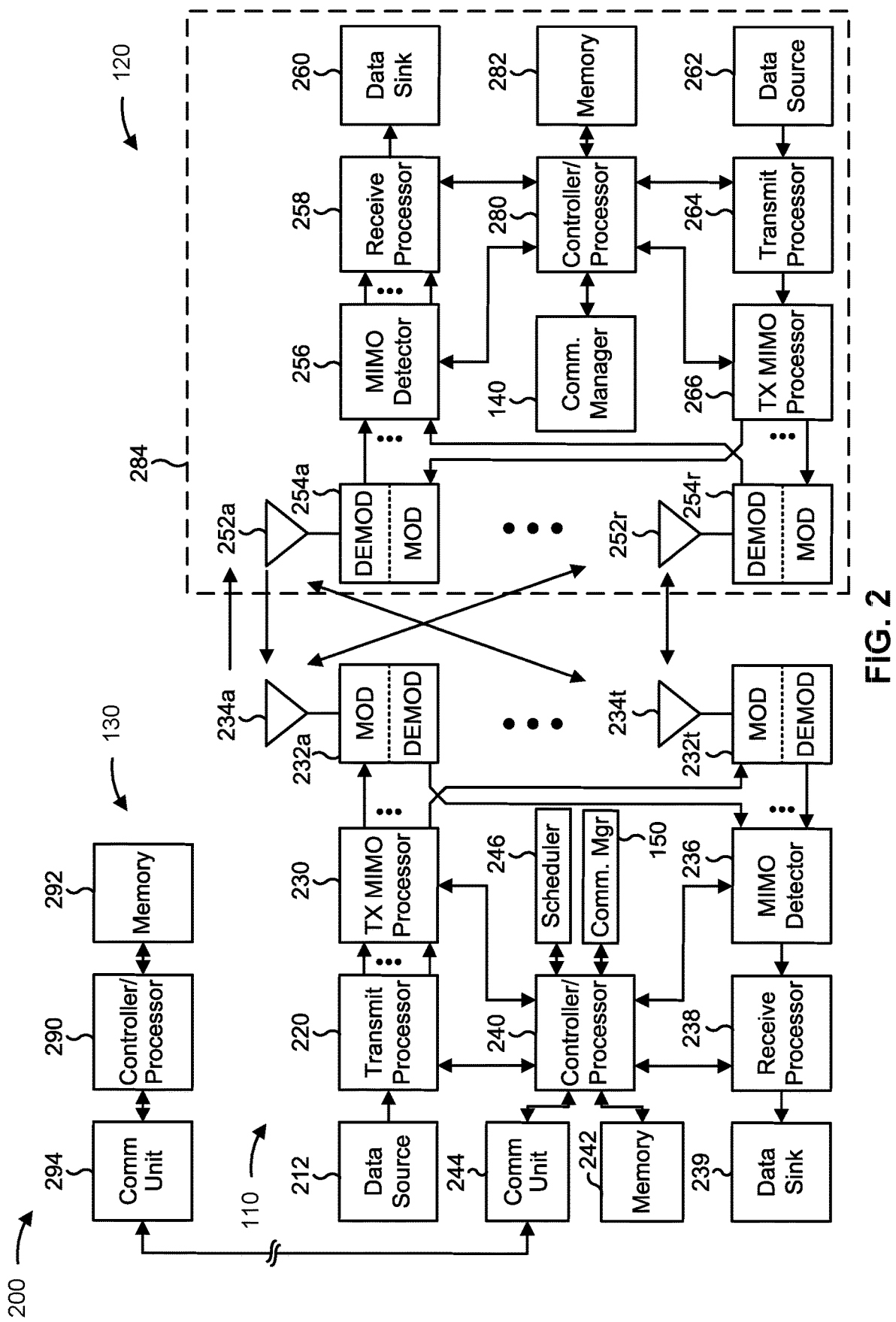
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for orthogonal frequency division multiplexing (OFDM)) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-23).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-23).

The controller/processor 240 of the network node 110, the controller/processor 280 of the UE 120, and/or any other component(s) of FIG. 2 may perform one or more techniques associated with OCCs for uplink transmissions, as described in more detail elsewhere herein. For example, the controller/processor 240 of the network node 110, the controller/processor 280 of the UE 120, and/or any other component(s) of FIG. 2 may perform or direct operations of, for example, process 2000 of FIG. 20, process 2100 of FIG. 21, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 2000 of FIG. 20, process 2100 of FIG. 21, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; means for applying, based at least in part on the configuration, the OCC to an uplink transmission; and/or means for transmitting the uplink transmission with the OCC applied based at least in part on the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC; and/or means for receiving an uplink transmission with an OCC applied to the uplink transmission based at least in part on the configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
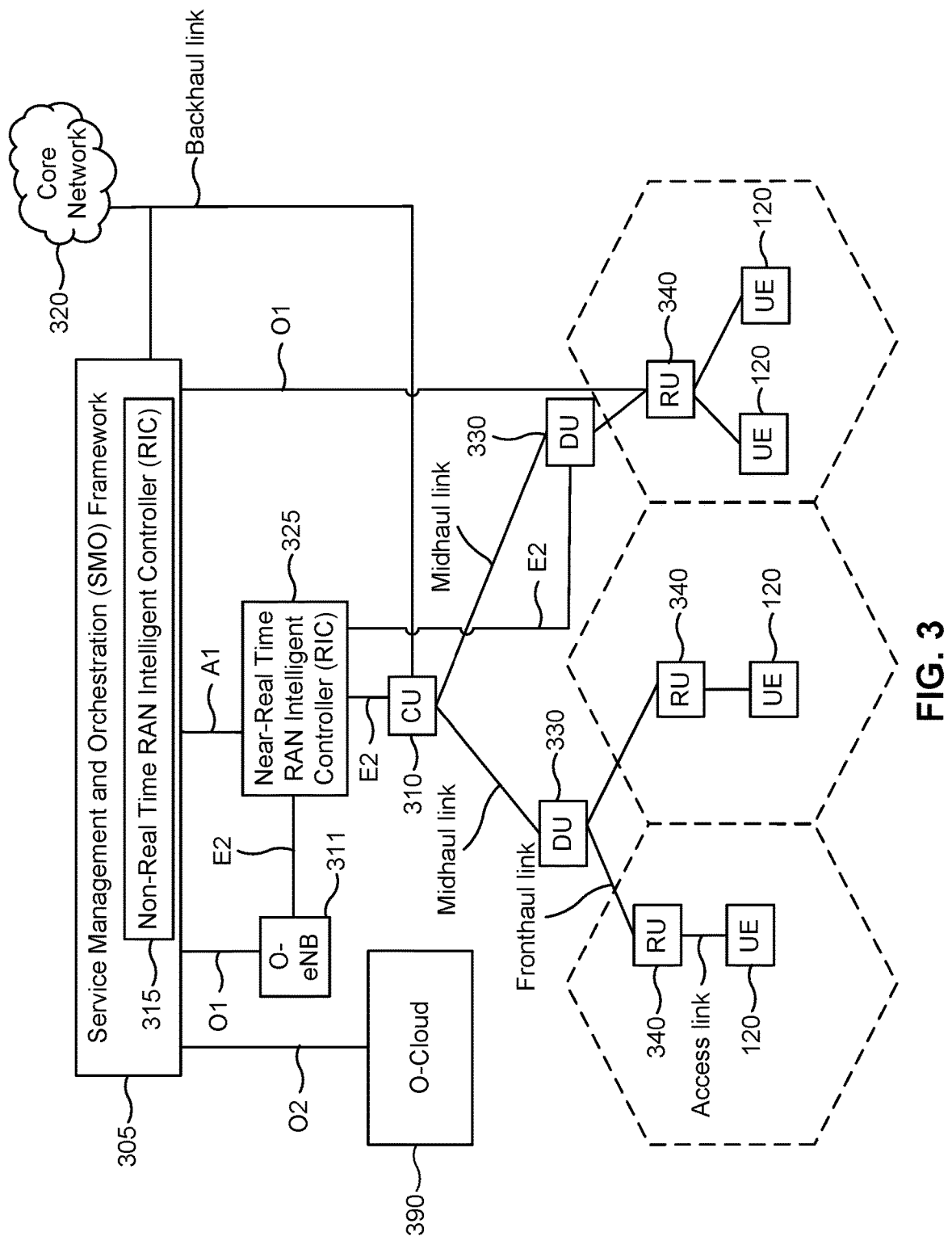
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Multiple access schemes may be used to multiplex multiple UEs, which may increase a system capacity. Multiplexing multiple UEs may increase the system capacity because more UEs may be supported with a same amount of time-frequency resources, as compared to no multiplexing of multiple UEs. Multiplexing multiple UEs may create interference at a network node. An OCC may be used to mitigate the interference resulting from multiplexed multiple users. Data from UEs may be cover coded across repetitions in an orthogonal manner using the OCC. A repetition nature of uplink transmissions may allow a system to apply the OCC. An OFDM grid structure and different types of resource allocations and TBoMS may allow the OCC to be applied, using various techniques.

Figure 4:
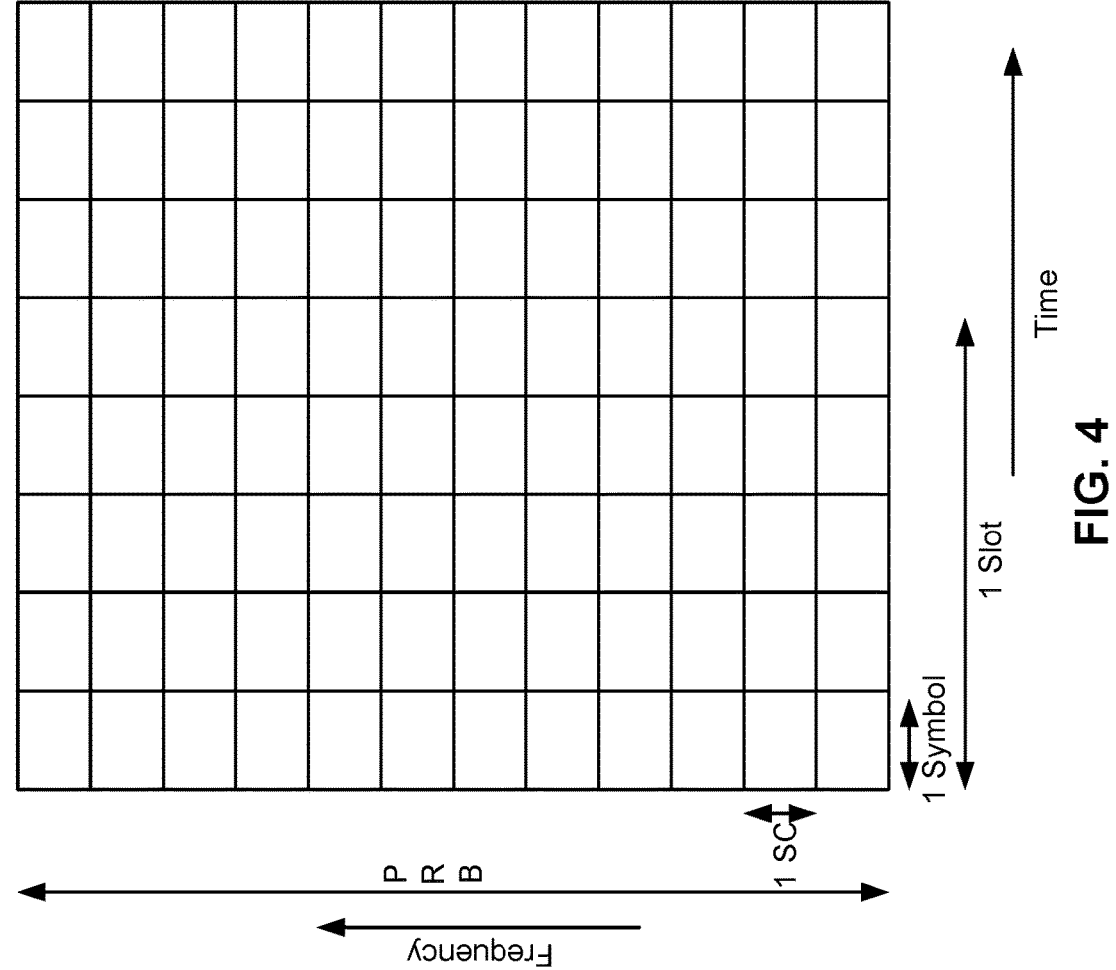
FIG. 4 is a diagram illustrating an example of an orthogonal frequency division multiplexing (OFDM) grid structure, in accordance with the present disclosure.

FIG. 4 is a diagram illustrating an example 400 of an OFDM grid structure, in accordance with the present disclosure.

As shown in FIG. 4, in an OFDM grid structure, OFDM resources may be based at least in part on a time frequency grid with symbols in time and subcarriers (SCs) in frequency. Frequency resources may be allocated in units referred to as physical resource blocks (PRBs). Each PRB may have $N_{scperprb}$ subcarriers. Multiple PRBs $N_{PRB}$ may be allocated to the same UE. Time resources may be allocated in units referred to as slots. Each slot may have $N_{symsperslot}$ OFDM symbols. Multiple slots $N_{slots}$ may be allocated to the same UE. With TBoMS for an uplink, $N_{rep}$ repetitions may be available for a whole transmission. A total number of resource elements (REs) allocated to a UE may be calculated in accordance with: $N_{RE}=N_{rep}N_{PRB}N_{scperprb}N_{slots}N_{symsperslot}$. The OFDM grid structure may allow an OCC to be applied using various techniques.

As indicated above, FIG. 4 is provided as an example. Other examples may differ from what is described with regard to FIG. 4.

Figure 5:
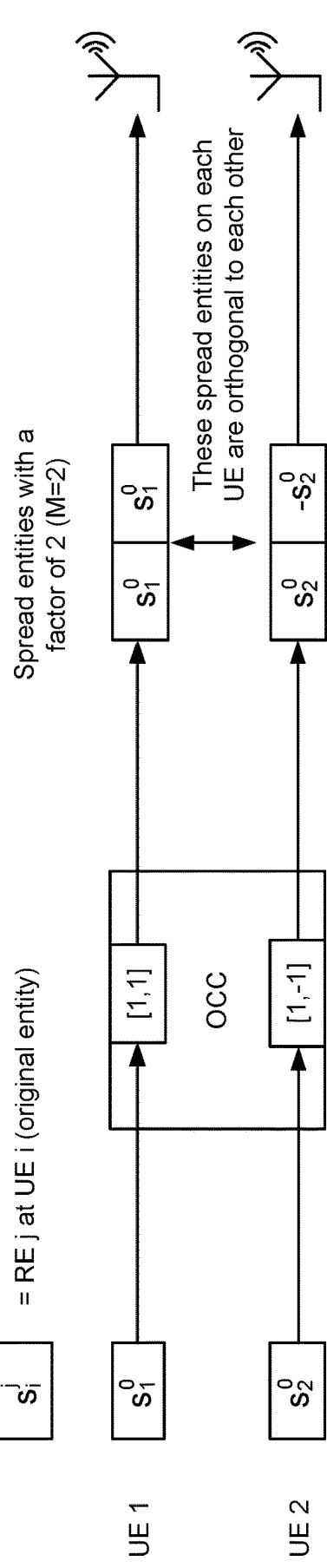
FIG. 5 is a diagram illustrating an example of an orthogonal cover code (OCC) for two UEs, in accordance with the present disclosure.

FIG. 5 is a diagram illustrating an example 500 of an OCC for two UEs, in accordance with the present disclosure.

During an M factor OCC, an entity may be spread into M entities, where M denotes a number of UEs multiplexed by OCC. The M spread entities may be orthogonal to each other. Resources may be shared simultaneously by all M UEs. No additional REs may be needed while using OCC. Further, when OCC is applied, one RE (in time or frequency) may be spread into M REs.

As shown in FIG. 5, $$s_i^j$$

may indicate an RE j at UE i (original entity). A first UE may be associated with symbol $$s_1^0,$$

and a second UE may be associated with symbol $$s_2^0.$$

The first UE may apply an OCC of [1 1] to the symbol $$s_1^0,$$

which may result in $$s_1^0$$

and $$s_1^0.$$

The second UE may apply an OCC of [1 −1] to the symbol $$s_2^0,$$

which may result in $$s_2^0 \text{ and } -s_2^0.$$

The $$s_1^0 \text{ and } s_1^0,$$

and the $$s_2^0 \text{ and } -s_2^0,$$

may be spread entities with a factor of 2 (M=2), and these spread entities on each UE may be orthogonal to each other.

As indicated above, FIG. 5 is provided as an example. Other examples may differ from what is described with regard to FIG. 5.

Figure 6:
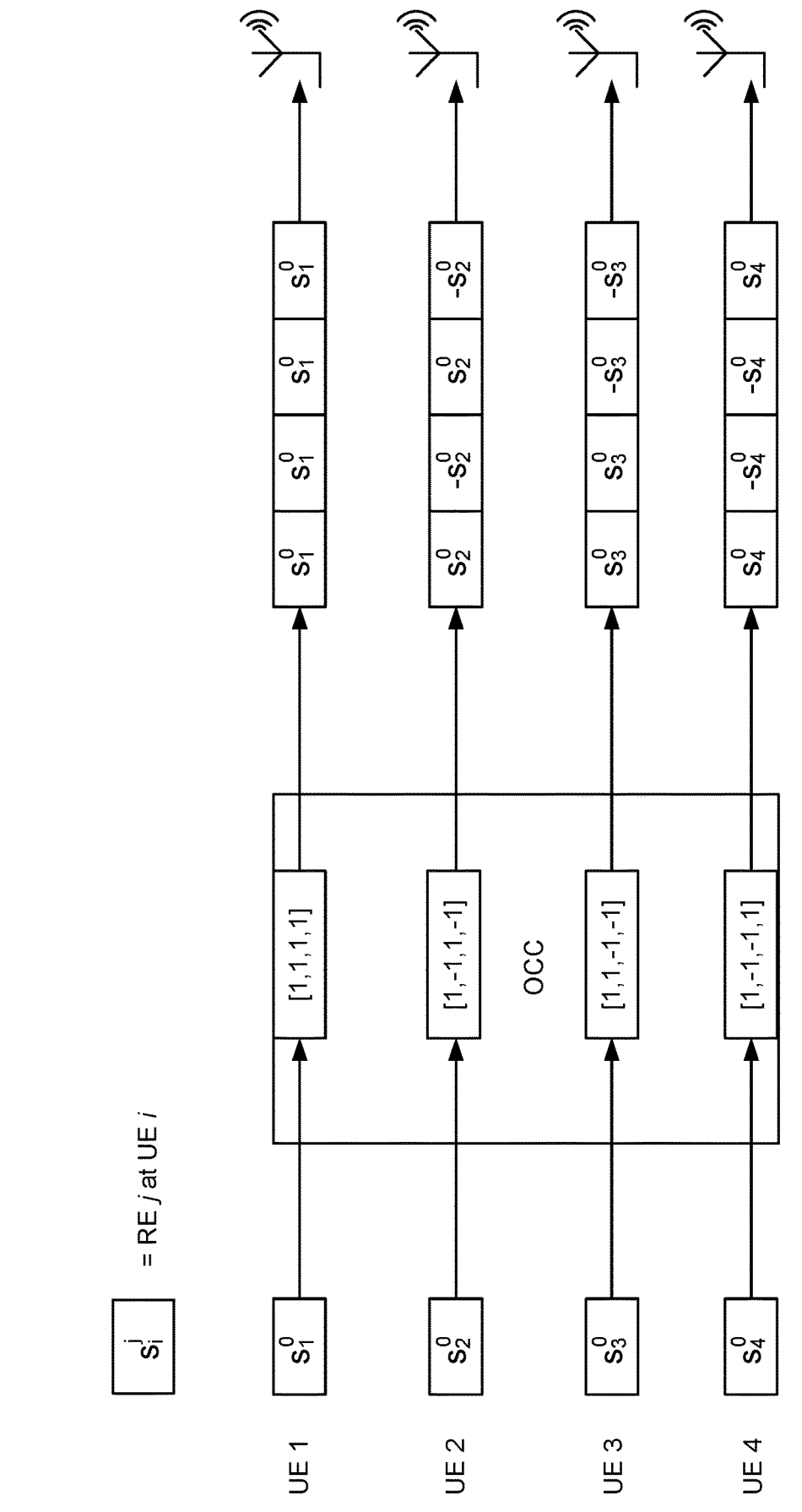
FIG. 6 is a diagram illustrating an example of an OCC for four UEs, in accordance with the present disclosure.

FIG. 6 is a diagram illustrating an example 600 of an OCC for four UEs, in accordance with the present disclosure.

As shown in FIG. 6, $$s_i^j$$

may indicate an RE j at UE i (original entity). A first UE may be associated with symbol $$s_1^0,$$

a second UE may be associated with symbol $$s_2^0,$$

a third UE may be associated with symbol $$s_3^0,$$

and a fourth UE may be associated with symbol $$s_4^0.$$

The first UE may apply an OCC of [1, 1, 1, 1] to the symbol $$s_1^0,$$

which may result in $$s_1^0, s_1^0, s_1^0, \text{ and } s_1^0.$$

The second UE may apply an OCC of [1, −1, 1, −1] to the symbol $$s_2^0,$$

which may result in $$s_2^0, -s_2^0, s_2^0 \text{ and } -s_2^0.$$

The third UE may apply an OCC of [1, 1, 1, −1] to the symbol $$s_3^0,$$

which may result in $$s_3^0, s_3^0, -s_3^0 \text{ and } -s_3^0.$$

The fourth UE may apply an OCC of [1, −1, −1, 1] to the symbol $$s_4^0,$$

which may result in $$s_4^0, -s_4^0, -s_4^0 \text{ and } s_4^0.$$

In this example, resulting spread entities may have a factor of 4 (M=4), and these spread entities on each UE may be orthogonal to each other.

As indicated above, FIG. 6 is provided as an example. Other examples may differ from what is described with regard to FIG. 6.

A UE may not be configured to apply OCC with TBoMS. The UE may not be configured to apply various schemes of OCC in a frequency domain and/or in a time domain. As a result, multiple access schemes may be unable to be used to multiplex multiple UEs. An inability to apply OCC to effectively mitigate interference may degrade an overall system performance. For example, interference at a network node caused by multiplexing multiple UEs may not be resolved when OCC cannot be applied, which may degrade the overall system performance.

In various aspects of techniques and apparatuses described herein, a UE may receive, from a network node, a configuration associated with an OCC. The configuration may indicate a multiplexing order M, an OCC codeword for multiplexing, and a type of OCC. The type of OCC may include FD-OCC, TD-OCC, sub-PRB OCC, or sub-slot OCC. The UE may apply, based at least in part on the configuration, the OCC to an uplink transmission. The UE may transmit, to the network node, the uplink transmission with the OCC applied based at least in part on the configuration. The network node may be associated with a terrestrial network or an NTN. The OCC may be associated with a repetition-based transmission (e.g., an uplink transmission that is repetition based). Alternatively, the OCC may be associated with a non-repetition-based transmission, as long as sufficient time and frequency resources are present to perform the OCC with some degree of reliability.

In some aspects, by configuring the UE with various OCC schemes with TBoMS or non-TBoMS, the described techniques can be used to support OCCs for mitigating interference at the network node. The OCCs may mitigate the interference, which may be a result of using multiple access schemes to multiplex multiple UEs for increasing a system capacity. When the UE is configured with an ability to apply various schemes of OCC (e.g., FD-OCC, TD-OCC, sub-PRB OCC, or sub-slot OCC), the interference at the network node may be reduced, which may improve an overall system performance. The various schemes of OCC may allow multiple UEs to be multiplexed without causing interference to the network node. As a number of UEs served by a specific set of uplink carriers is increased, repetitions along with OCC in a time domain and/or frequency domain may be employed to improve the overall system performance.

Figure 7:
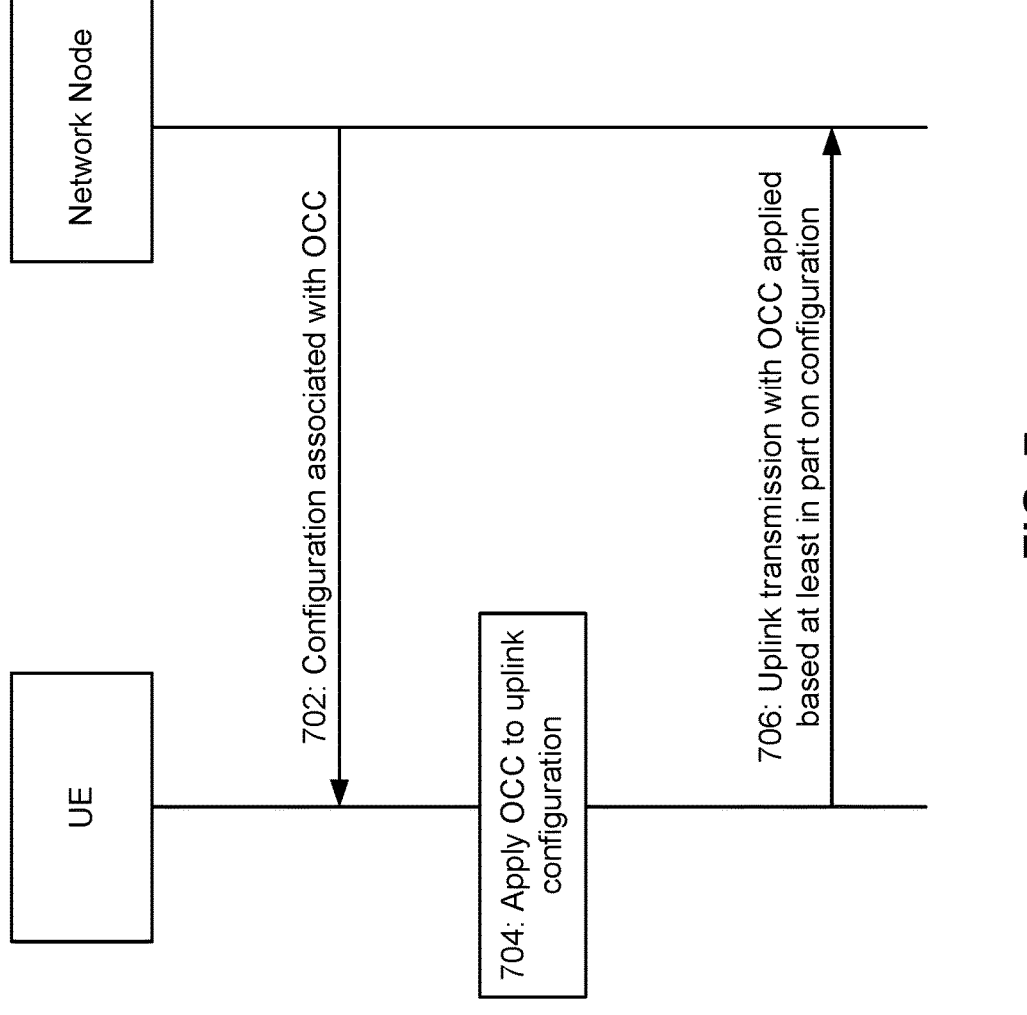

FIG. 7 is a diagram illustrating an example 700 associated with OCCs for uplink transmissions, in accordance with the present disclosure. As shown in FIG. 7, example 700 includes communication between a UE (e.g., UE 120) and a network node (e.g., network node 110). In some aspects, the UE and the network node may be included in a wireless network, such as wireless network 100.

As shown by reference number 702, the UE may receive, from the network node, a configuration associated with an OCC. The configuration may indicate a multiplexing order M. The configuration may indicate an OCC codeword for multiplexing. The configuration may indicate a type of OCC. The type of OCC may be FD-OCC, TD-OCC, sub-PRB OCC, or sub-slot OCC. The OCC may be associated with TBoMS. The multiplexing order may be associated with a number of UEs multiplexed by OCC, and a set of resources may be shared simultaneously by the number of UEs. The OCC may be associated with an orthogonal matrix. A transport block size (TBS) or a number of information bits may be based at least in part on the multiplexing order.

In some aspects, the UE may transmit, to the network node, capability signaling that indicates whether the UE is capable of supporting multiplexing. A capability for multiplexing may be based at least in part on a phase coherence capability associated with the UE. The UE may receive the configuration based at least in part on the capability signaling.

As shown by reference number 704, the UE may apply, based at least in part on the configuration, the OCC to an uplink transmission. In some aspects, the UE may apply the FD-OCC across subcarriers in a frequency domain. The UE may apply the FD-OCC within a PRB or across PRBs. In some aspects, the UE may apply the TD-OCC across symbols in a time domain. The UE may apply the TD-OCC within a slot or across slots. In some aspects, the UE may apply the sub-PRB OCC in a frequency domain such that an allocated subcarrier power is boosted by a factor and some subcarriers are left empty. The UE may apply the sub-PRB OCC within a PRB or across PRBs. Multiplexed UEs may be allocated on some sub-carriers within the PRB based at least in part on the sub-PRB OCC. In some aspects, the UE may apply the sub-slot OCC in a time domain such that an allocated symbol power is boosted by a factor and some symbols are left empty. The UE may apply the sub-slot OCC within a slot or across slots. Multiplexed UEs may be allocated on some symbols within a slot based at least in part on the sub-slot OCC.

In some aspects, various types of OCC may be defined. In FD-OCC, an OCC may be applied in a frequency domain (e.g., across subcarriers). In this case, one subcarrier after OCC may occupy M subcarriers. In TD-OCC (symbol-level OCC), an OCC may be applied in a time domain (e.g., i.e., across OFDM symbols). In this case, one OFDM symbol after OCC may become M OFDM symbols. In sub-PRB OCC, multiplexed UEs may be allocated on some subcarriers within a PRB (e.g., a single UE may not occupy a whole PRB). The sub-PRB OCC may be considered a special case of FD-OCC. In sub-slot OCC, multiplexed UEs may be allocated on some symbols within a slot (e.g., a single UE may not occupy a whole slot). The sub-slot OCC may be considered a special case of TD-OCC.

In some aspects, the UE may transmit, to the network node, capability signaling that indicates that the UE is able to support multiplexing. A capability for multiplexing may depend on phase coherence capabilities associated with the UE. The network node may transmit, to the UE and based at least in part on the capability signaling, the configuration of UE specific details regarding OCC. The network node may configure the UE via RRC signaling or a MAC control element (MAC-CE). The network node may indicate, to the UE, a multiplexing order M, which may be based at least in part on the phase coherence capabilities reported by the UE. The network node may indicate, to the UE, the type of OCC to be applied by the UE. The type of OCC may include FD-OCC, TD-OCC (symbol-level OCC), sub-PRB OCC, or sub-slot OCC. Further, the network node may indicate, to the UE, an OCC codeword for multiplexing. The network node may assign the OCC codeword to the UE for multiplexing. The UE may apply OCC based at least in part on the configuration received from the network node.

As shown by reference number 706, the UE may transmit, to the network node, the uplink transmission with the OCC applied based at least in part on the configuration. The uplink transmission may be a data signal transmission or a reference signal transmission. By applying the OCC to the uplink transmission, the UE may be multiplexed with other UEs without causing interference to the network node.

As indicated above, FIG. 7 is provided as an example. Other examples may differ from what is described with regard to FIG. 7.

In some aspects, in FD-OCC, OCC may be applied in only a frequency domain (e.g., spreading may be done over subcarriers within the same symbol). OCC may be applied in different patterns. At least M subcarriers may be needed for FD-OCC to work for multiplexing M UEs. In some aspects, FD-OCC may be done within a PRB. M may be a factor of $N_{scperprb}$. For example, for $N_{scperprb}=12$, M=2, 3, 4, 6, 12 may be supported. Such a configuration may ensure no wastage of resources. Other values of M may be used but may result in wastage of resources. In some aspects, FD- OCC may be done across PRBs. M may be a factor of $N_{PRB}N_{scperprb}$. For example, for $N_{PRB}N_{scperprb}=2\times12=24$, M=2, 3, 4, 6, 8, 12, 24 may be supported. Such a configuration may ensure no wastage of resources. Other values of M may be used but may result in wastage of resources.

In some aspects, FD-OCC may be applied to different types of uplink data or uplink reference signals, such as a physical uplink shared channel (PUSCH) signal, a DMRS, or a phase tracking reference signal (PTRS). FD-OCC may be expected to work better with TBoMS (multiple repetitions), as opposed to non-TBoMS, since FD-OCC may be applied over multiple repetitions. An orthogonal matrix may be used as an OCC (e.g., Hadamard or discrete Fourier transform (DFT)). Further, to accommodate OCC, a TBS or a number of information bits may be modified based at least in part on M.

Figure 8:
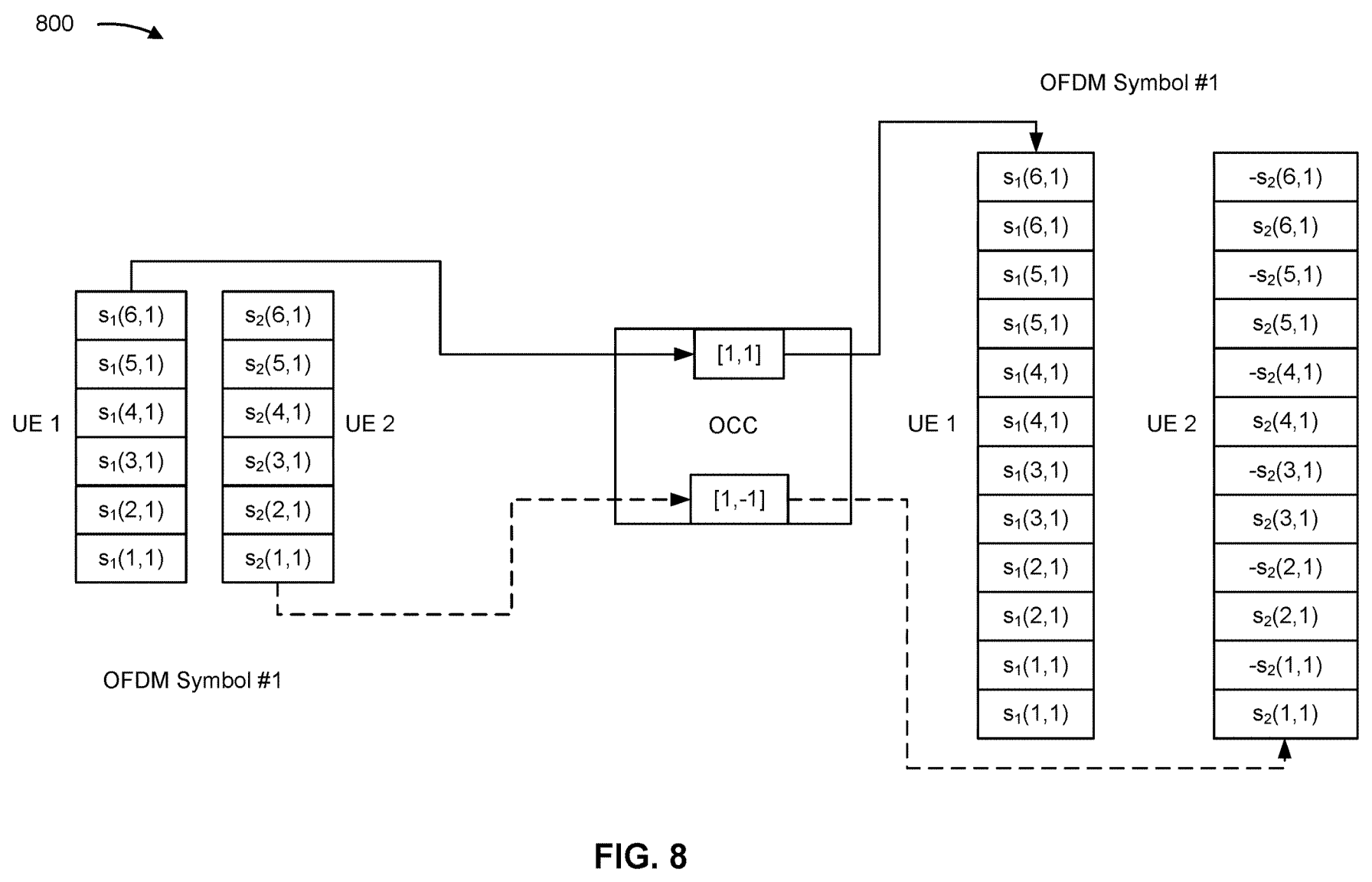

FIG. 8 is a diagram illustrating an example 800 associated with OCCs for uplink transmissions, in accordance with the present disclosure.

In some aspects, for FD-OCC, let $s_i(k,t)$ be an RE at frequency resource k and time resource t on UE i. OCC may be applied in a frequency domain (index k) (e.g., OCC may be done within the same OFDM symbol, and one subcarrier may become M subcarriers after OCC).

As shown in FIG. 8, for FD-OCC and M=2 (two UEs), a first UE may apply an OCC of [1, 1] to symbol $s_1$, and a second UE may apply an OCC of [1, −1] to symbol $s_2$. The OCC may be applied within the same OFDM symbol (e.g., OFDM symbol #1) in accordance with a first pattern. One subcarrier may become two subcarriers after OCC.

As indicated above, FIG. 8 is provided as an example. Other examples may differ from what is described with regard to FIG. 8.

FIG. 9 is a diagram illustrating an example 900 associated with OCCs for uplink transmissions, in accordance with the present disclosure.

As shown in FIG. 9, for FD-OCC and M=2 (two UEs), a first UE may apply an OCC of [1, 1] to symbol $s_1$, and a second UE may apply an OCC of [1, −1] to symbol $s_2$. The OCC may be applied within the same OFDM symbol (e.g., OFDM symbol #1) in accordance with a second pattern. One subcarrier may become two subcarriers after OCC.

As indicated above, FIG. 9 is provided as an example. Other examples may differ from what is described with regard to FIG. 9.

Figure 10:
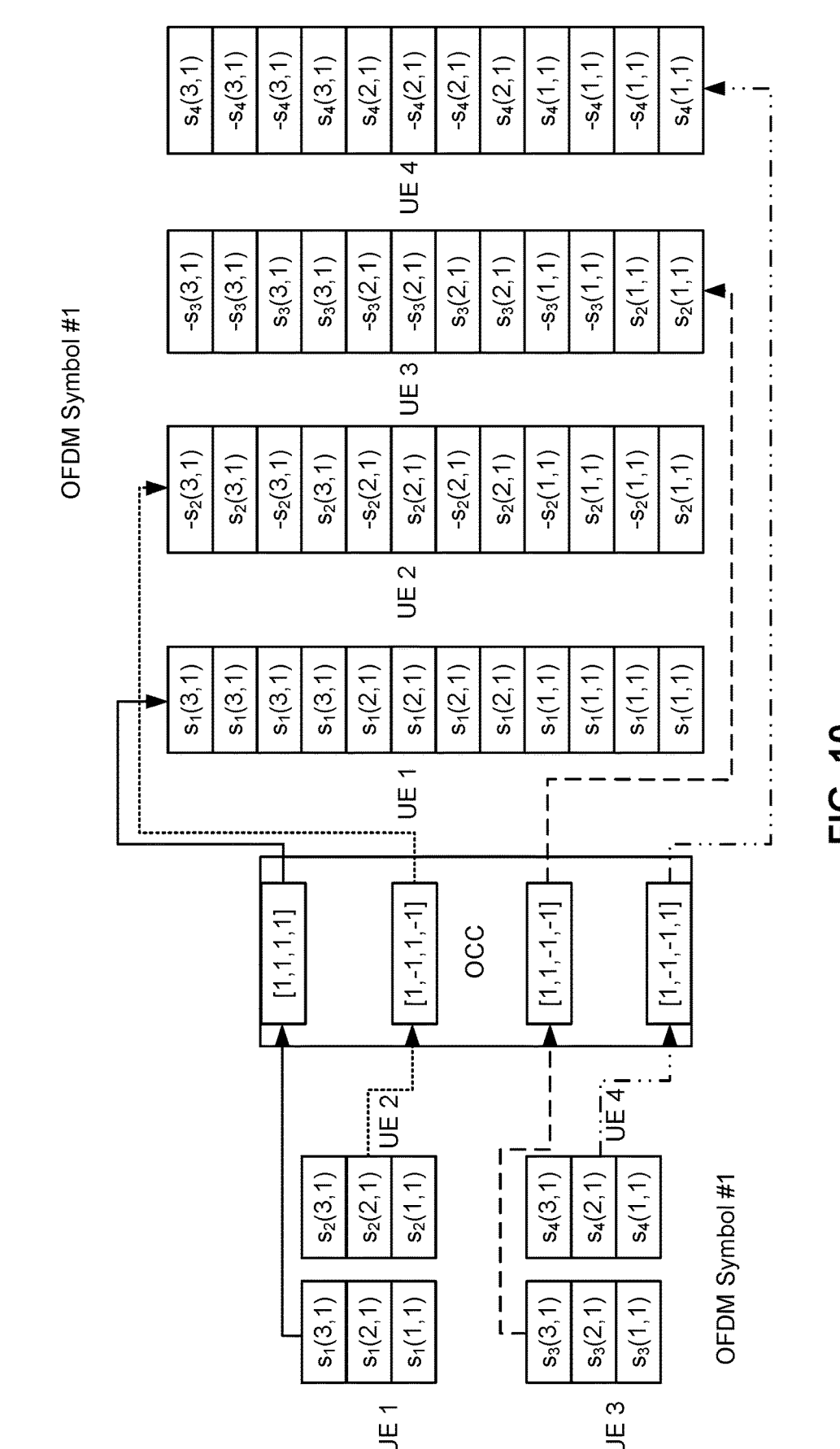

FIG. 10 is a diagram illustrating an example 1000 associated with OCCs for uplink transmissions, in accordance with the present disclosure.

As shown in FIG. 10, for FD-OCC and M=4 (four UEs), a first UE may apply an OCC of [1, 1, 1, 1] to symbol $s_1$, a second UE may apply an OCC of [1, −1, 1, −1] to symbol $s_2$, a third UE may apply an OCC of [1, 1, −1, −1] to symbol $s_3$, and a fourth UE may apply an OCC of [1, −1, −1, 1] to symbol $s_4$. The OCC may be applied within the same OFDM symbol (e.g., OFDM symbol #1). One subcarrier may become four subcarriers after OCC.

As indicated above, FIG. 10 is provided as an example. Other examples may differ from what is described with regard to FIG. 10.

FIG. 11 is a diagram illustrating an example 1100 associated with OCCs for uplink transmissions, in accordance with the present disclosure.

As shown in FIG. 11, for FD-OCC and M=2 (two UEs), a first UE may apply an OCC of [1, 1] to symbol $s_1$, and a second UE may apply an OCC of [1, −1] to symbol $s_2$. The OCC may be applied within each of a number of OFDM symbols (e.g., OFDM symbol #1,OFDM symbol #2,and OFDM symbol #3), which may be in accordance with an evolution with time (symbols). At each OFDM symbol, one subcarrier may become two subcarriers after OCC.

As indicated above, FIG. 11 is provided as an example. Other examples may differ from what is described with regard to FIG. 11.

MMM $N_{symsperslot}N_{symsperslot}$=12, M=2, 3, 4, 6, 12 MM $N_{slot}N_{symsperslot}$=$N_{slot}N_{symsperslot}$=2×12=24M=2, 3, 4, 6, 8, 12, 24M In some aspects, in TD-OCC, OCC may be applied in only a time domain (e.g., spreading may be done over OFDM symbols). OCC may be applied in different patterns. Consecutive symbols may be used after OCC (e.g., symbol #1 and symbol #2). A non-consecutive allocation may be used as well (e.g., symbol #1 and symbol #3). At least OFDM symbols may be needed for TD-OCC to work for multiplexing UEs. In some aspects, TD-OCC may be done within a slot. may be a factor of. For example, for may be supported. Such a configuration may ensure no wastage of resources. Other values of may be used but may result in wastage of resources. In some aspects, TD-OCC may be done across slots. may be a factor of. For example, for MMM $N_{symsperslot}N_{symsperslot}$=12, M=2, 3, 4, 6, 12 MM $N_{slot}N_{symsperslot}$ $N_{slot}N_{symsperslot}$=2×12=24M=2, 3, 4, 6, 8, 12, 24M, may be supported. Such a configuration may ensure no wastage of resources. Other values of M may be used but may result in wastage of resources.

In some aspects, TD-OCC may be applied to different types of signals, such as uplink data or uplink reference signals. TD-OCC may be expected to work better with TBoMS (multiple repetitions), as opposed to non-TBoMS, since TD-OCC may be applied over multiple repetitions. An orthogonal matrix may be used as an OCC (e.g., Hadamard or DFT). Further, to accommodate OCC, a TBS or a number of information bits may be modified based at least in part on M.

Figure 12:
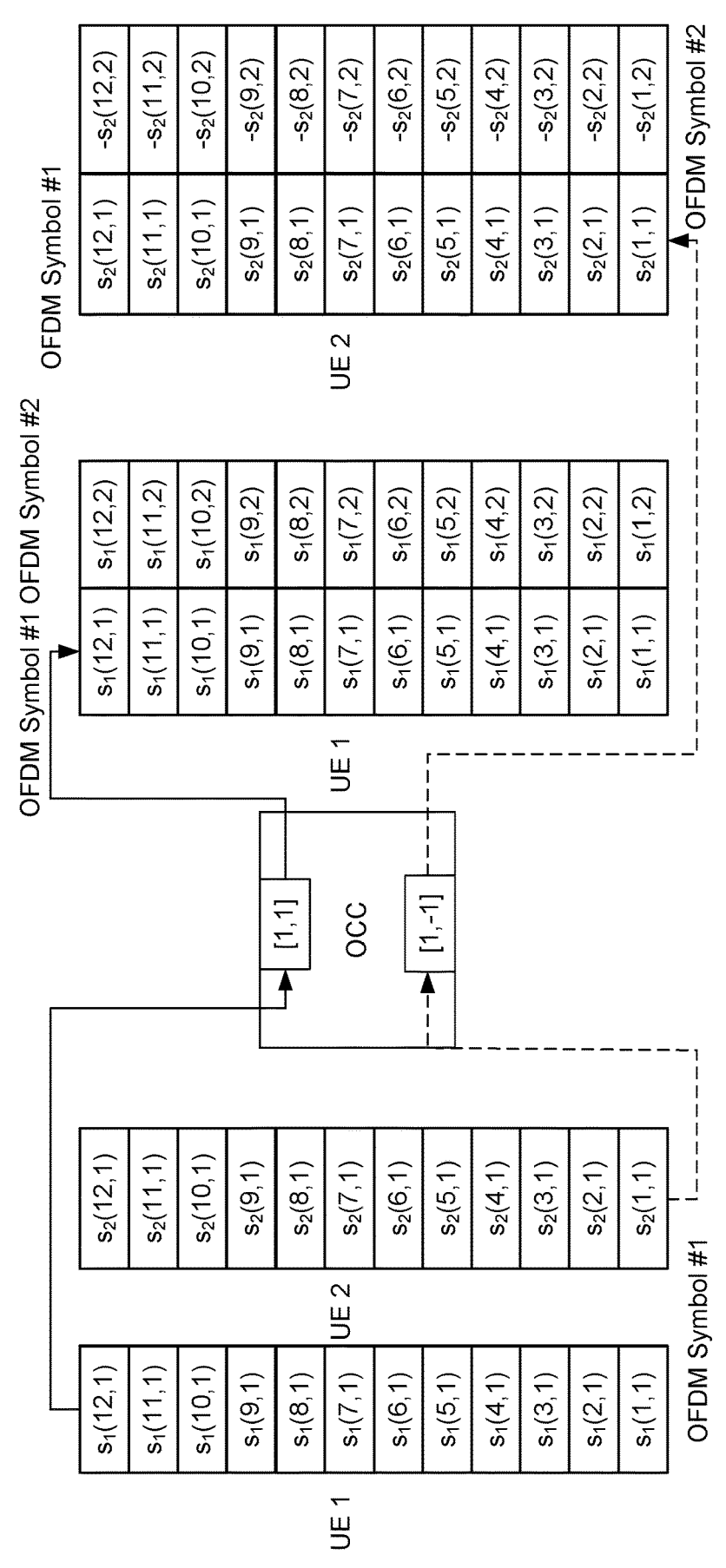

FIG. 12 is a diagram illustrating an example 1200 associated with OCCs for uplink transmissions, in accordance with the present disclosure.

In some aspects, for TD-OCC, let $s_i(k,t)$ be an RE at frequency resource k and time resource t on UE i. OCC may be applied in a time domain (index t), (e.g., OCC may be done across OFDM symbols, and one OFDM symbol may become M symbols after OCC).

As shown in FIG. 12, for TD-OCC and M=2 (two UEs), a first UE may apply an OCC of [1, 1] to symbol $s_1$, and a second UE may apply an OCC of [1, −1] to symbol $s_2$. The OCC may be applied across OFDM symbols (e.g., OFDM symbol #1 and OFDM symbol #2) in a time domain. One OFDM symbol may become two OFDM symbols after OCC.

As indicated above, FIG. 12 is provided as an example. Other examples may differ from what is described with regard to FIG. 12.

Figure 13:
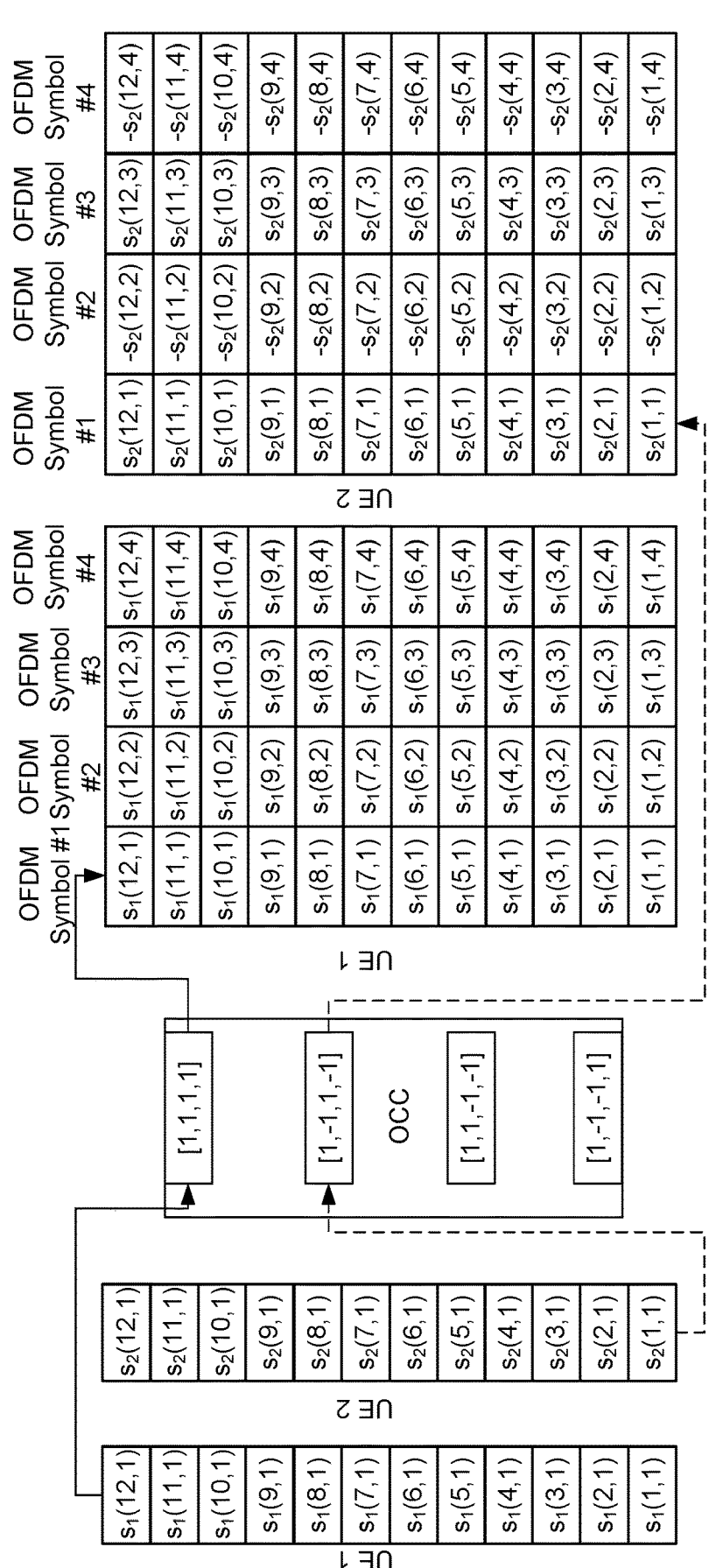

FIG. 13 is a diagram illustrating an example 1300 associated with OCCs for uplink transmissions, in accordance with the present disclosure.

As shown in FIG. 13, for TD-OCC and M=4 (four UEs), a first UE may apply an OCC of [1, 1, 1, 1] to symbol $s_1$, a second UE may apply an OCC of [1, −1, 1, −1] to symbol $s_2$, a third UE may apply an OCC of [1, 1, −1, −1] to symbol $s_3$ (not shown), and a fourth UE may apply an OCC of [1, −1, −1, 1] to symbol $s_4$ (not shown). The OCC may be applied across OFDM symbols (e.g., OFDM symbol #1, OFDM symbol #2, OFDM symbol #3, and OFDM symbol #4) in a time domain. One OFDM symbol may become four OFDM symbols after OCC.

As indicated above, FIG. 13 is provided as an example. Other examples may differ from what is described with regard to FIG. 13.

In some aspects, in sub-PRB OCC, OCC may be applied in a frequency domain, such that an allocated subcarrier power may be boosted by a factor of M and some subcarriers may be left empty. OCC may be applied in different patterns. At least M subcarriers may be needed for sub-PRB OCC to work for multiplexing M UEs. In some aspects, sub-PRB OCC may be done within a PRB. M may be a factor of $N_{scperprb}$. For example, for $N_{scperprb}$=12, M=2, 3, 4, 6, 12 may be supported. In this case, $$\frac{N_{scperprb}}{M}$$

occupied subcarriers may be per UE in a PRB, and $$N_{scperprb} - \frac{N_{scperprb}}{M}$$

subcarriers may be empty per UE in a PRB. Such a configuration may ensure no wastage of resources. Other values of M may be used but may result in wastage of resources. In some aspects, sub-PRB OCC may be done across PRBs. M may be a factor of $N_{PRB}N_{scperprb}$. For example, for $N_{PRB}N_{scperprb}$=2×12=24, M=2, 3, 4, 6, 8, 12, 24 may be supported. In this case, $$\frac{N_{PRB}N_{scperprb}}{M}$$

occupied subcarriers may be per UE, and $$N_{PRB}N_{scperprb} - \frac{N_{PRB}N_{scperprb}}{M}$$

subcarriers may be empty per UE. Such a configuration may ensure no wastage of resources. Other values of M may be used but may result in wastage of resources.

In some aspects, sub-PRB OCC may be applied to different types of signals, such as uplink data or uplink reference signals. Sub-PRB OCC may be expected to work better with TBoMS (multiple repetitions), as opposed to non-TBoMS, since sub-PRB OCC may be applied over multiple repetitions. For OCC, matrices of form $\sqrt{M}I_M$ may be used with their rows/columns permutated, as long as orthogonality between rows is maintained, where $I_M$ is an M×M identity matrix. Further, to accommodate OCC, a TBS or a number of information bits may be modified based at least in part on M.

Figure 14:
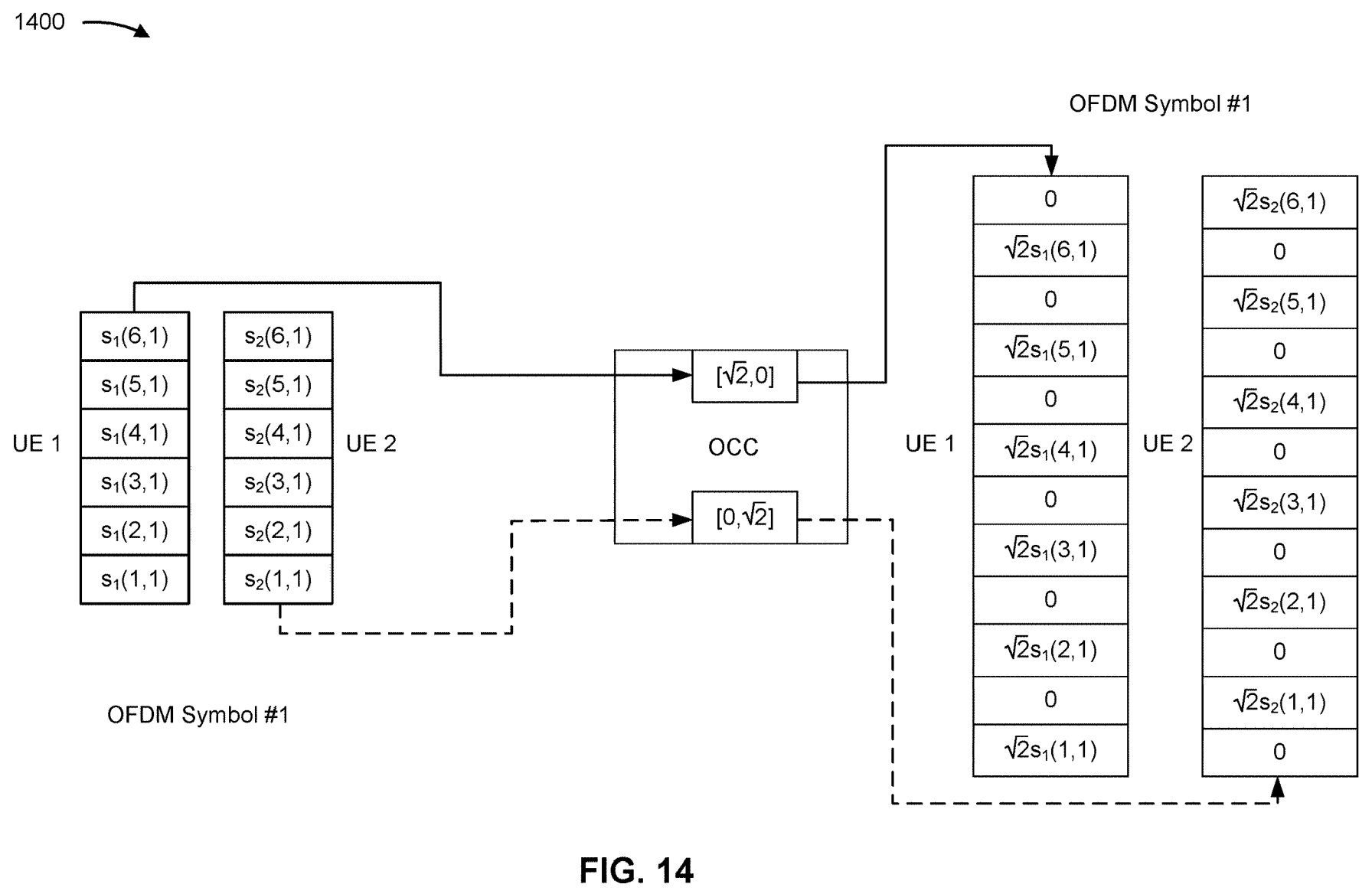

FIG. 14 is a diagram illustrating an example 1400 associated with OCCs for uplink transmissions, in accordance with the present disclosure.

In some aspects, for sub-PRB OCC, let $s_i(k,t)$ be an RE at frequency resource k and time resource t on UE i. OCC may be applied in a frequency domain, and some subcarriers may be left empty, while non-empty subcarriers may have their power boosted by a factor of M.

As shown in FIG. 14, for sub-PRB OCC and M=2 (two UEs), a first UE may apply an OCC of [√2,0] to symbol $s_1$, and a second UE may apply an OCC of [0,√2] to symbol $s_2$, in accordance with a first pattern. The first UE and the second UE may apply respective OCCs in a frequency domain. Some subcarriers may be left empty (e.g., 0), while non-empty subcarriers may have their power boosted by a factor of M (e.g., $\sqrt{2}$).

As indicated above, FIG. 14 is provided as an example. Other examples may differ from what is described with regard to FIG. 14.

Figure 15:
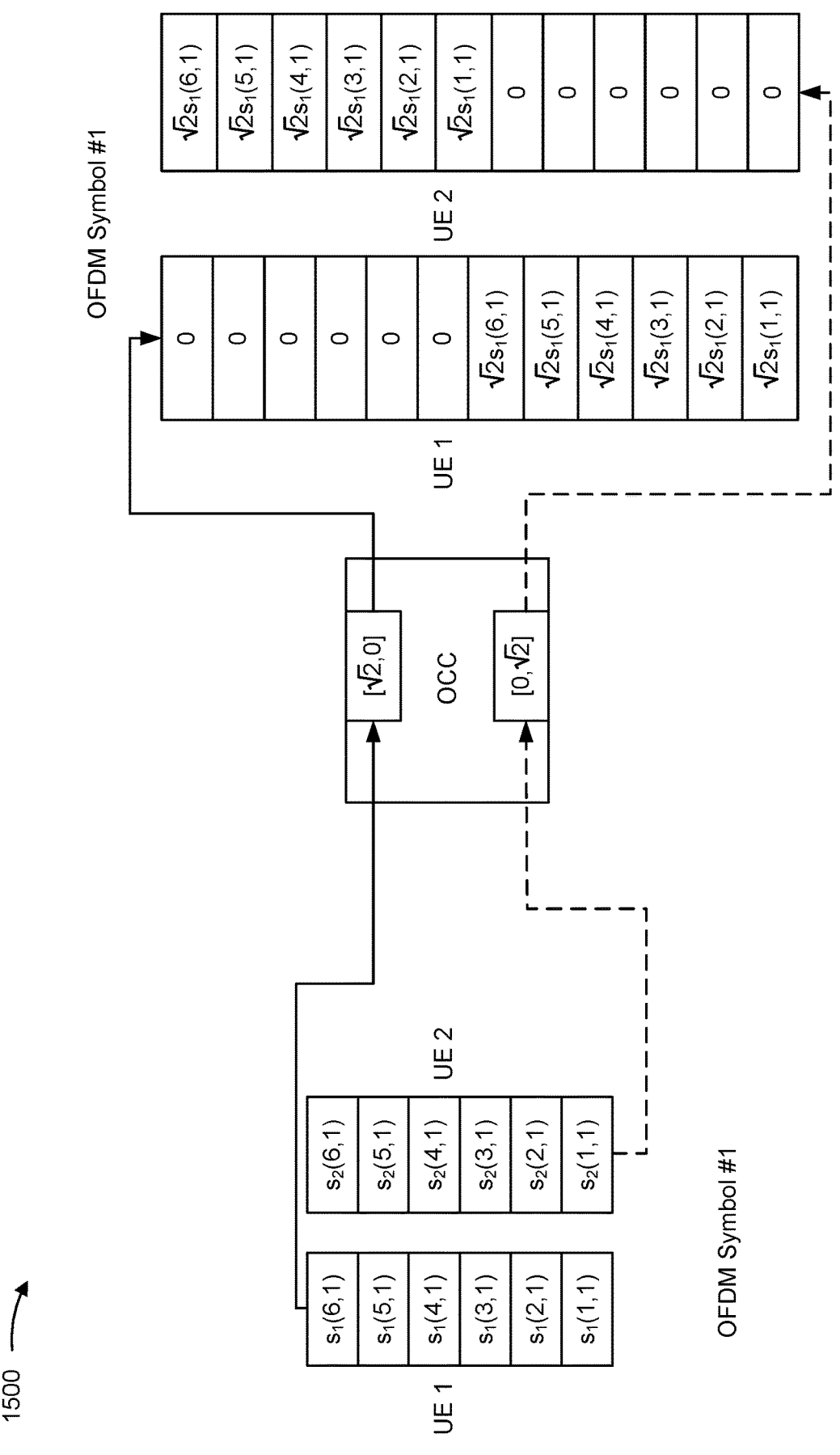

FIG. 15 is a diagram illustrating an example 1500 associated with OCCs for uplink transmissions, in accordance with the present disclosure.

As shown in FIG. 15, for sub-PRB OCC and M=2 (two UEs), a first UE may apply an OCC of $[\sqrt{2},0]$ to symbol $s_1$, and a second UE may apply an OCC of $[0,\sqrt{2}]$ to symbol $s_2$, in accordance with a second pattern. The first UE and the second UE may apply respective OCCs in a frequency domain (same symbol, such as OFDM symbol #1). Some subcarriers may be left empty (e.g., 0), while non-empty subcarriers may have their power boosted by a factor of M (e.g., $\sqrt{M}$ or $\sqrt{2}$).

As indicated above, FIG. 15 is provided as an example. Other examples may differ from what is described with regard to FIG. 15.

Figure 16:
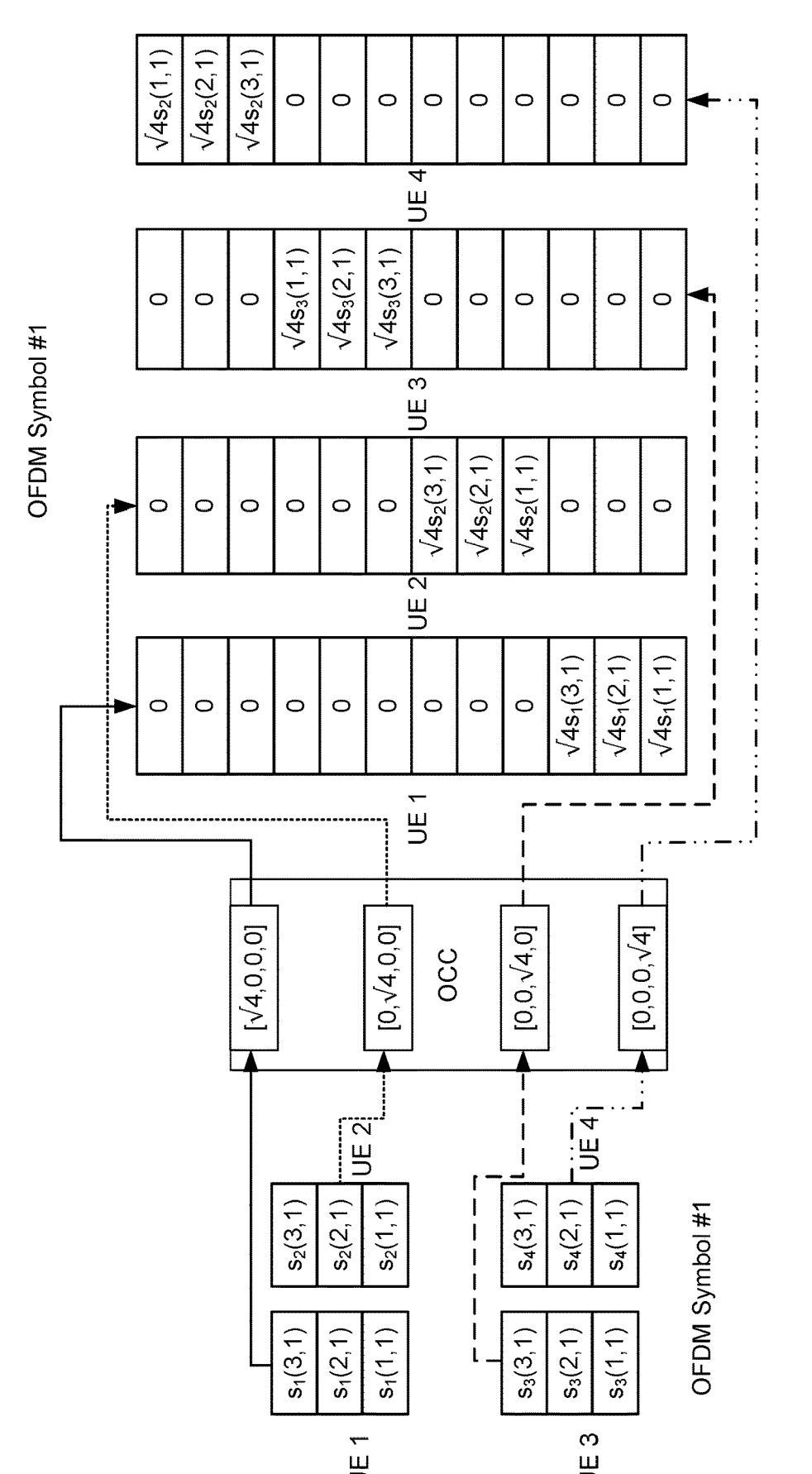

FIG. 16 is a diagram illustrating an example 1600 associated with OCCs for uplink transmissions, in accordance with the present disclosure.

As shown in FIG. 16, for sub-PRB OCC and M=4 (four UEs), a first UE may apply an OCC of $[\sqrt{4},0,0,0]$ to symbol $s_1$, a second UE may apply an OCC of $[0,\sqrt{4},0,0]$ to symbol $s_2$, a third UE may apply an OCC of $[0,0,\sqrt{4},0]$ to symbol $s_3$ (not shown), and a fourth UE may apply an OCC of $[0,0,0,\sqrt{4}]$ to symbol $s_4$ (not shown). The OCC may be applied in a frequency domain (same symbol, such as OFDM symbol #1). Some subcarriers may be left empty (e.g., 0), while non-empty subcarriers may have their power boosted by a factor of M (e.g., $\sqrt{M}$ or $\sqrt{4}$).

As indicated above, FIG. 16 is provided as an example. Other examples may differ from what is described with regard to FIG. 16.

Figure 17:
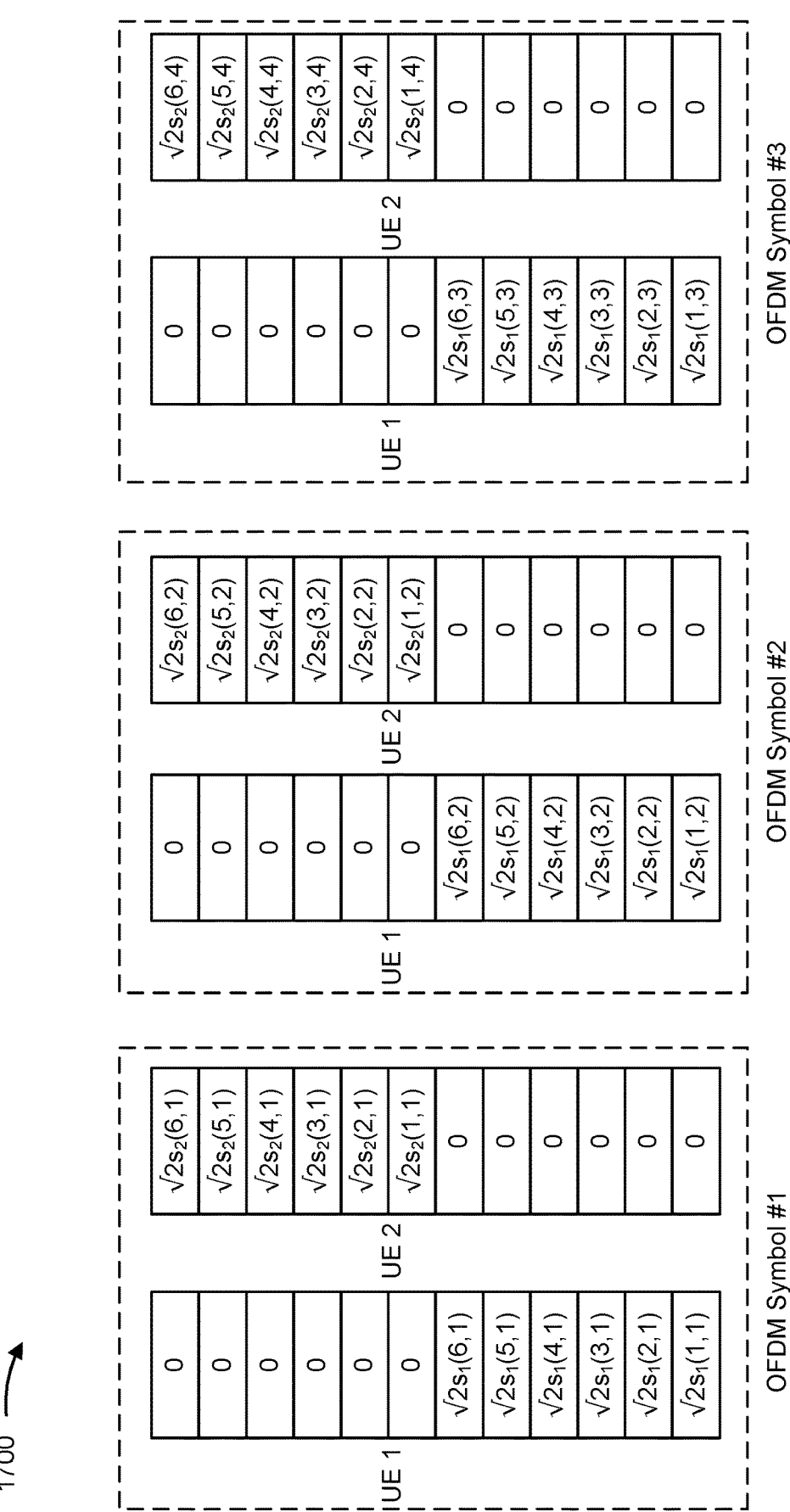

FIG. 17 is a diagram illustrating an example 1700 associated with OCCs for uplink transmissions, in accordance with the present disclosure.

As shown in FIG. 17, for sub-PRB OCC and M=2 (two UEs), a first UE may apply an OCC of $[\sqrt{2},0]$ to symbol $s_1$, and a second UE may apply an OCC of $[0,\sqrt{2}]$ to symbol $s_2$. The OCC may be applied, at each OFDM symbol (e.g., OFDM symbol #1, OFDM symbol #2, and OFDM symbol #3), in a frequency domain, which may be in accordance with an evolution with time (symbols). Within each OFDM symbol, some subcarriers may be left empty (e.g., 0), while non-empty subcarriers may have their power boosted by a factor of M (e.g., $\sqrt{M}$ or $\sqrt{2}$).

As indicated above, FIG. 17 is provided as an example. Other examples may differ from what is described with regard to FIG. 17.

In some aspects, in sub-slot OCC, OCC may be applied in a time domain, such that an allocated symbol power may be boosted by a factor of M and some symbols may be left empty. OCC may be applied in different patterns. At least M subcarriers may be needed for sub-slot OCC to work for multiplexing M UEs. In some aspects, sub-slot OCC may be done within a slot. M may be a factor of $N_{symsperslot}$. For example, for $N_{symsperslot}$=12, M=2, 3, 4, 6, 12 may be supported. In this case, $$\frac{N_{symsperslot}}{M}$$

occupied symbols may be per UE in a slot, and $$N_{symsperslot} - \frac{N_{symsperslot}}{M}$$

symbols may be empty per UE in a slot. Such a configuration may ensure no wastage of resources. Other values of M may be used but may result in wastage of resources. In some aspects, sub-slot OCC may be done across slots. M may be a factor of $N_{slot}N_{symsperslot}$. For example, for $N_{slot}N_{symsperslot}$=2×12=24, M=2, 3, 4, 6, 8, 12, 24 may be supported. In this case, $$\frac{N_{slot}N_{symsperslot}}{M}$$

occupied symbols may be per UE, and $$N_{slot}N_{symsperslot} - \frac{N_{slot}N_{symsperslot}}{M}$$

symbols may be empty per UE. Such a configuration may ensure no wastage of resources. Other values of M may be used but may result in wastage of resources.

In some aspects, sub-slot OCC may be applied to different types of signals, such as uplink data or uplink reference signals. Sub-slot OCC may be expected to work better with TBoMS (multiple repetitions), as opposed to non-TBoMS, since sub-slot OCC may be applied over multiple repetitions. For OCC, matrices of form $\sqrt{M}I_M$ may be used with their rows/columns permutated, as long as orthogonality between rows is maintained, where $I_M$ is an M×M identity matrix. Further, to accommodate OCC, a TBS or a number of information bits may be modified based at least in part on M.

Figure 18:
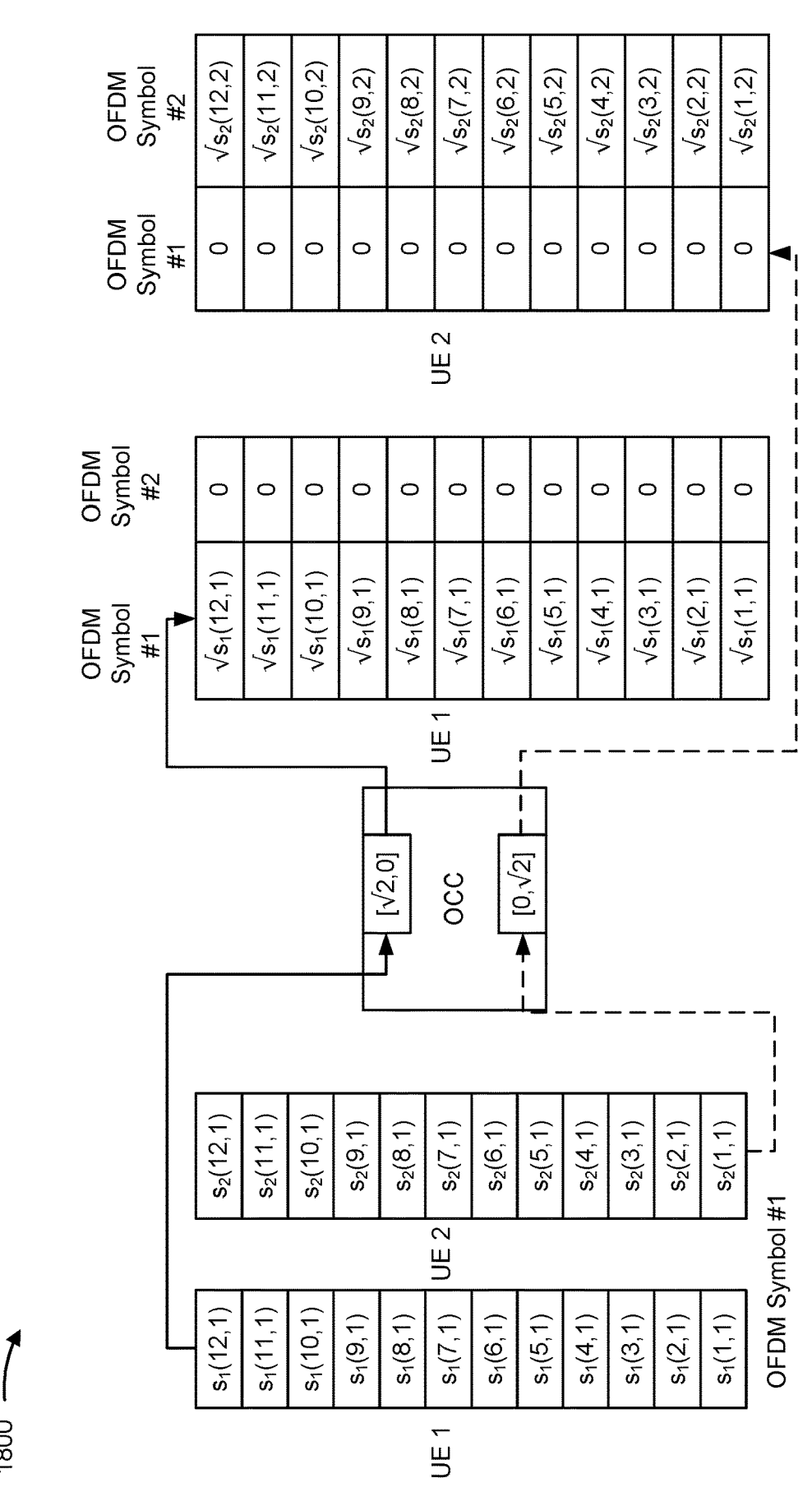

FIG. 18 is a diagram illustrating an example 1800 associated with OCCs for uplink transmissions, in accordance with the present disclosure.

In some aspects, for sub-slot OCC, let $s_i(k,t)$ be an RE at frequency resource k and time resource t on UE i. OCC may be applied in a time domain (index t) (e.g., OCC may be done across OFDM symbols). Some symbols may be left empty, while non-empty symbols may have their power boosted by a factor of M.

As shown in FIG. 18, for sub-slot OCC and M=2 (two UEs), a first UE may apply an OCC of $[\sqrt{2},0]$ to symbol $s_1$, and a second UE may apply an OCC of $[0,\sqrt{2}]$ to symbol $s_2$. The first UE and the second UE may apply respective OCCs in a frequency time (e.g., across OFDM symbols). Some symbols may be left empty (e.g., 0), while non-empty symbols may have their power boosted by a factor of M (e.g., $\sqrt{M}$ or $\sqrt{2}$).

As indicated above, FIG. 18 is provided as an example. Other examples may differ from what is described with regard to FIG. 18.

FIG. 19 is a diagram illustrating an example 1900 associated with OCCs for uplink transmissions, in accordance with the present disclosure.

As shown in FIG. 19, for sub-slot OCC and M=4 (four UEs), a first UE may apply an OCC of $[\sqrt{4},0,0,0]$ to symbol $s_1$, a second UE may apply an OCC of $[0,\sqrt{4},0,0]$ to symbol $s_2$, a third UE may apply an OCC of $[0,0,\sqrt{4},0]$ to symbol $s_3$ (not shown), and a fourth UE may apply an OCC of $[0,0,0,\sqrt{4}]$ to symbol $s_4$ (not shown). The OCC may be applied across OFDM symbols (e.g., OFDM symbol #1, OFDM symbol #2, OFDM symbol #3, and OFDM symbol #4) in a time domain. Some symbols may be left empty (e.g., 0), while non-empty symbols may have their power boosted by a factor of M (e.g., $\sqrt{M}$ or $\sqrt{4}$).

As indicated above, FIG. 19 is provided as an example. Other examples may differ from what is described with regard to FIG. 19.

FIG. 20 is a diagram illustrating an example process 2000 performed, for example, at a UE or an apparatus of a UE, in accordance with the present disclosure. Example process 2000 is an example where the apparatus or the UE (e.g., UE 120) performs operations associated with OCCs for uplink transmissions.

As shown in FIG. 20, in some aspects, process 2000 may include receiving a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC (block 2010). For example, the UE (e.g., using reception component 2202 and/or communication manager 2206, depicted in FIG. 22) may receive a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC, as described above.

As further shown in FIG. 20, in some aspects, process 2000 may include applying, based at least in part on the configuration, the OCC to an uplink transmission (block 2020). For example, the UE (e.g., using communication manager 2206, depicted in FIG. 22) may apply, based at least in part on the configuration, the OCC to an uplink transmission, as described above.

As further shown in FIG. 20, in some aspects, process 2000 may include transmitting the uplink transmission with the OCC applied based at least in part on the configuration (block 2030). For example, the UE (e.g., using transmission component 2204 and/or communication manager 2206, depicted in FIG. 22) may transmit the uplink transmission with the OCC applied based at least in part on the configuration, as described above.

Process 2000 may include additional aspects, such as any single aspect or any combination of aspects described below and/or in connection with one or more other processes described elsewhere herein.

In a first aspect, process 2000 includes transmitting capability signaling that indicates whether the UE is capable of supporting multiplexing, a capability for multiplexing is based at least in part on a phase coherence capability associated with the UE, and the configuration is received based at least in part on the capability signaling.

In a second aspect, alone or in combination with the first aspect, the multiplexing order is associated with a number of UEs multiplexed by OCC, and a set of resources are shared simultaneously by the number of UEs.

In a third aspect, alone or in combination with one or more of the first and second aspects, the OCC is associated with TBoMS or a repetition-based transmission, or the OCC is associated with a non-repetition-based transmission.

In a fourth aspect, alone or in combination with one or more of the first through third aspects, process 2000 includes applying the FD-OCC across subcarriers in a frequency domain, and the FD-OCC is applied within a PRB or across PRBs.

In a fifth aspect, alone or in combination with one or more of the first through fourth aspects, process 2000 includes applying the TD-OCC across symbols in a time domain, and the TD-OCC is applied within a slot or across slots.

In a sixth aspect, alone or in combination with one or more of the first through fifth aspects, process 2000 includes applying the sub-PRB OCC in a frequency domain such that an allocated subcarrier power is boosted by a factor and some subcarriers are left empty, wherein the sub-PRB OCC is applied within a PRB or across PRBs, or multiplexed UEs are allocated on some sub-carriers within the PRB based at least in part on the sub-PRB OCC.

In a seventh aspect, alone or in combination with one or more of the first through sixth aspects, process 2000 includes applying the sub-slot OCC in a time domain such that an allocated symbol power is boosted by a factor and some symbols are left empty, wherein the sub-slot OCC is applied within a slot or across slots, or multiplexed UEs are allocated on some symbols within a slot based at least in part on the sub-slot OCC.

In an eighth aspect, alone or in combination with one or more of the first through seventh aspects, the uplink transmission is a data transmission or a reference signal transmission.

In a ninth aspect, alone or in combination with one or more of the first through eighth aspects, the OCC is associated with an orthogonal matrix.

In a tenth aspect, alone or in combination with one or more of the first through ninth aspects, a TBS or a number of information bits is based at least in part on the multiplexing order.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
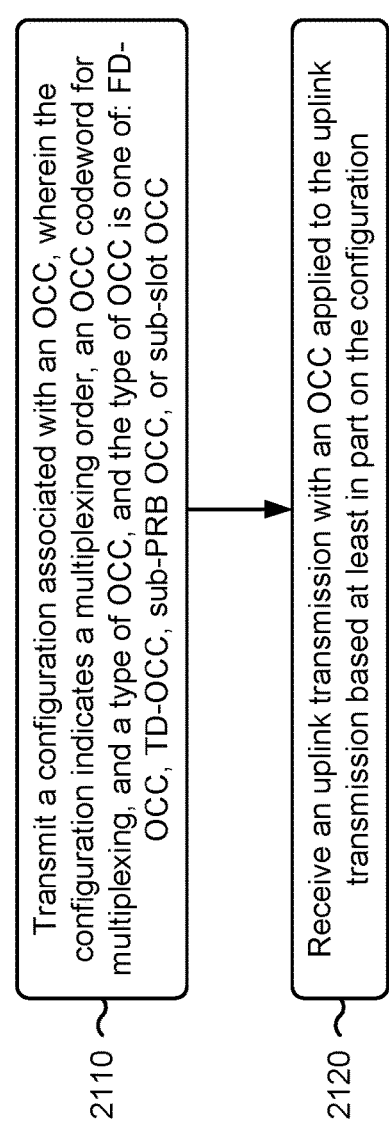

FIG. 21 is a diagram illustrating an example process 2100 performed, for example, at a network node or an apparatus of a network node, in accordance with the present disclosure. Example process 2100 is an example where the apparatus or the network node (e.g., network node 110) performs operations associated with OCCs for uplink transmissions.

As shown in FIG. 21, in some aspects, process 2100 may include transmitting a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC (block 2110). For example, the network node (e.g., using transmission component 2304 and/or communication manager 2306, depicted in FIG. 23) may transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC, as described above.

As further shown in FIG. 21, in some aspects, process 2100 may include receiving an uplink transmission with an OCC applied to the uplink transmission based at least in part on the configuration (block 2120). For example, the network node (e.g., using reception component 2302 and/or communication manager 2306, depicted in FIG. 23) may receive an uplink transmission with an OCC applied to the uplink transmission based at least in part on the configuration, as described above.

Process 2100 may include additional aspects, such as any single aspect or any combination of aspects described below and/or in connection with one or more other processes described elsewhere herein.

In a first aspect, process 2100 includes receiving capability signaling that indicates whether a UE is capable of supporting multiplexing, wherein a capability for multiplexing is based at least in part on a phase coherence capability associated with the UE, and the configuration is transmitted based at least in part on the capability signaling.

In a second aspect, alone or in combination with the first aspect, the multiplexing order is associated with a number of UEs multiplexed by OCC, and a set of resources are shared simultaneously by the number of UEs.

In a third aspect, alone or in combination with one or more of the first and second aspects, the OCC is associated with TBoMS or a repetition-based transmission, or the OCC is associated with a non-repetition-based transmission.

In a fourth aspect, alone or in combination with one or more of the first through third aspects, the FD-OCC is applied across subcarriers in a frequency domain, and the FD-OCC is applied within a PRB or across PRBs.

In a fifth aspect, alone or in combination with one or more of the first through fourth aspects, the TD-OCC is applied across symbols in a time domain, and the TD-OCC is applied within a slot or across slots.

In a sixth aspect, alone or in combination with one or more of the first through fifth aspects, the sub-PRB OCC is applied in a frequency domain such that an allocated sub-carrier power is boosted by a factor and some subcarriers are left empty, the sub-PRB OCC is applied within a PRB or across PRBs, or multiplexed UEs are allocated on some sub-carriers within the PRB based at least in part on the sub-PRB OCC.

In a seventh aspect, alone or in combination with one or more of the first through sixth aspects, the sub-slot OCC is applied in a time domain such that an allocated symbol power is boosted by a factor and some symbols are left empty, and sub-slot OCC is applied within a slot or across slots, or multiplexed UEs are allocated on some symbols within a slot based at least in part on the sub-slot OCC.

In an eighth aspect, alone or in combination with one or more of the first through seventh aspects, the uplink transmission is a data transmission or a reference signal transmission.

In a ninth aspect, alone or in combination with one or more of the first through eighth aspects, the OCC is associated with an orthogonal matrix.

In a tenth aspect, alone or in combination with one or more of the first through ninth aspects, a TBS or a number of information bits is based at least in part on the multiplexing order.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
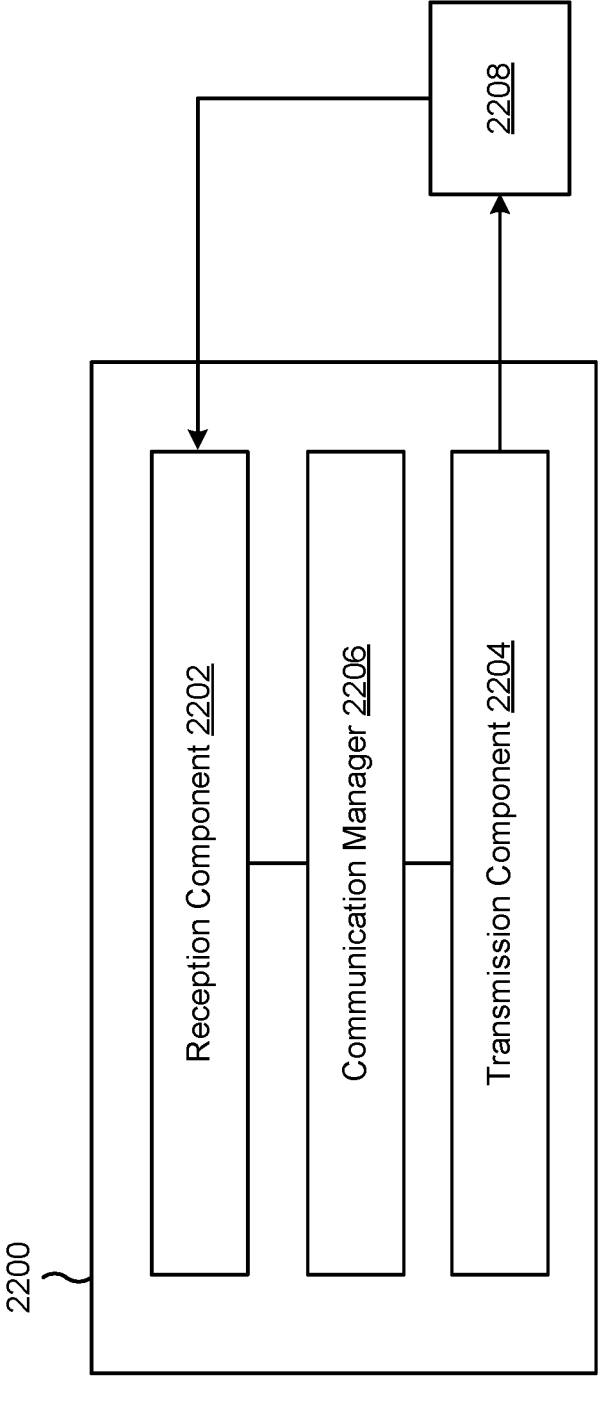
FIGS. 22-23 are diagrams of example apparatuses for wireless communication, in accordance with the present disclosure.

FIG. 22 is a diagram of an example apparatus 2200 for wireless communication, in accordance with the present disclosure. The apparatus 2200 may be a UE, or a UE may include the apparatus 2200. In some aspects, the apparatus 2200 includes a reception component 2202, a transmission component 2204, and/or a communication manager 2206, which may be in communication with one another (for example, via one or more buses and/or one or more other components). In some aspects, the communication manager 2206 is the communication manager 140 described in connection with FIG. 1. As shown, the apparatus 2200 may communicate with another apparatus 2208, such as a UE or a network node (such as a CU, a DU, an RU, or a base station), using the reception component 2202 and the transmission component 2204.

In some aspects, the apparatus 2200 may be configured to perform one or more operations described herein in connection with FIGS. 7-19. Additionally, or alternatively, the apparatus 2200 may be configured to perform one or more processes described herein, such as process 2000 of FIG. 20. In some aspects, the apparatus 2200 and/or one or more components shown in FIG. 22 may include one or more components of the UE described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2202 may receive communications, such as reference signals, control information, data communications, or a combination thereof, from the apparatus 2208. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 2204 may transmit communications, such as reference signals, control information, data communications, or a combination thereof, to the apparatus 2208. In some aspects, one or more other components of the apparatus 2200 may generate communications and may provide the generated communications to the transmission component 2204 for transmission to the apparatus 2208. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2208. In some aspects, the transmission component 2204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 2204 may be co-located with the reception component 2202 in one or more transceivers.

The communication manager 2206 may support operations of the reception component 2202 and/or the transmission component 2204. For example, the communication manager 2206 may receive information associated with configuring reception of communications by the reception component 2202 and/or transmission of communications by the transmission component 2204. Additionally, or alternatively, the communication manager 2206 may generate and/or provide control information to the reception component 2202 and/or the transmission component 2204 to control reception and/or transmission of communications.

The reception component 2202 may receive a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC. The communication manager 2206 may apply, based at least in part on the configuration, the OCC to an uplink transmission. The transmission component 2204 may transmit the uplink transmission with the OCC applied based at least in part on the configuration. The transmission component 2204 may transmit capability signaling that indicates whether the UE is capable of supporting multiplexing, wherein a capability for multiplexing is based at least in part on a phase coherence capability associated with the UE, and the configuration is received based at least in part on the capability signaling.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
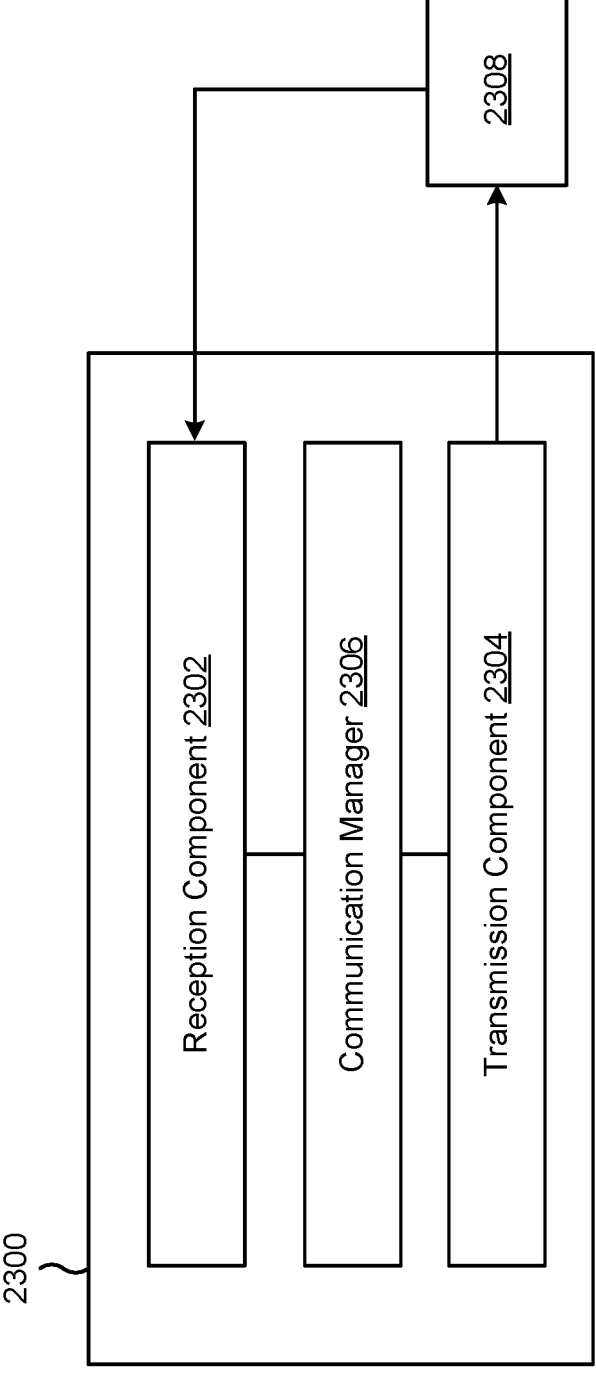

FIG. 23 is a diagram of an example apparatus 2300 for wireless communication, in accordance with the present disclosure. The apparatus 2300 may be a network node, or a network node may include the apparatus 2300. In some aspects, the apparatus 2300 includes a reception component 2302, a transmission component 2304, and/or a communication manager 2306, which may be in communication with one another (for example, via one or more buses and/or one or more other components). In some aspects, the communication manager 2306 is the communication manager 150 described in connection with FIG. 1. As shown, the apparatus 2300 may communicate with another apparatus 2308, such as a UE or a network node (such as a CU, a DU, an RU, or a base station), using the reception component 2302 and the transmission component 2304.

In some aspects, the apparatus 2300 may be configured to perform one or more operations described herein in connection with FIGS. 7-19. Additionally, or alternatively, the apparatus 2300 may be configured to perform one or more processes described herein, such as process 2100 of FIG. 21. In some aspects, the apparatus 2300 and/or one or more components shown in FIG. 23 may include one or more components of the network node described in connection with FIG. 2. Additionally, or alternatively, one or more components shown in FIG. 23 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 2302 may receive communications, such as reference signals, control information, data communications, or a combination thereof, from the apparatus 2308. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 2302 and/or the transmission component 2304 may include or may be included in a network interface. The network interface may be configured to obtain and/or output signals for the apparatus 2300 via one or more communications links, such as a backhaul link, a midhaul link, and/or a fronthaul link.

The transmission component 2304 may transmit communications, such as reference signals, control information, data communications, or a combination thereof, to the apparatus 2308. In some aspects, one or more other components of the apparatus 2300 may generate communications and may provide the generated communications to the transmission component 2304 for transmission to the apparatus 2308. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2308. In some aspects, the transmission component 2304 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 2304 may be co-located with the reception component 2302 in one or more transceivers.

The communication manager 2306 may support operations of the reception component 2302 and/or the transmission component 2304. For example, the communication manager 2306 may receive information associated with configuring reception of communications by the reception component 2302 and/or transmission of communications by the transmission component 2304. Additionally, or alternatively, the communication manager 2306 may generate and/or provide control information to the reception component 2302 and/or the transmission component 2304 to control reception and/or transmission of communications.

The transmission component 2304 may transmit a configuration associated with an OCC, wherein the configuration indicates a multiplexing order, an OCC codeword for multiplexing, and a type of OCC, and the type of OCC is one of: FD-OCC, TD-OCC, sub-PRB OCC, or sub-slot OCC. The reception component 2302 may receive an uplink transmission with an OCC applied to the uplink transmission based at least in part on the configuration. The reception component 2302 may receive capability signaling that indicates whether a UE is capable of supporting multiplexing, wherein a capability for multiplexing is based at least in part on a phase coherence capability associated with the UE, and the configuration is transmitted based at least in part on the capability signaling.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

The following provides an overview of some Aspects of the present disclosure:

Aspect 1: A method of wireless communication performed by a user equipment (UE), comprising: receiving a configuration associated with an orthogonal cover code (OCC), wherein the configuration indicates a multiplexing order, an OCC codeword for multiplexing, and a type of OCC, and the type of OCC is one of: frequency domain OCC (FD-OCC), time domain OCC (TD-OCC), sub physical resource block (sub-PRB) OCC, or sub-slot OCC; applying, based at least in part on the configuration, the OCC to an uplink transmission; and transmitting the uplink transmission with the OCC applied based at least in part on the configuration.

Aspect 2: The method of Aspect 1, further comprising: transmitting capability signaling that indicates whether the UE is capable of supporting multiplexing, wherein a capability for multiplexing is based at least in part on a phase coherence capability associated with the UE, and the configuration is received based at least in part on the capability signaling.

Aspect 3: The method of any of Aspects 1-2, wherein the multiplexing order is associated with a number of UEs multiplexed by OCC, and a set of resources are shared simultaneously by the number of UEs.

Aspect 4: The method of any of Aspects 1-3, wherein the OCC is associated with transport blocks over multiple slots (TBoMS) or a repetition-based transmission, or the OCC is associated with a non-repetition-based transmission.

Aspect 5: The method of any of Aspects 1-4, wherein applying the OCC comprises applying the FD-OCC across subcarriers in a frequency domain, and the FD-OCC is applied within a PRB or across PRBs.

Aspect 6: The method of any of Aspects 1-5, wherein applying the OCC comprises applying the TD-OCC across symbols in a time domain, and the TD-OCC is applied within a slot or across slots.

Aspect 7: The method of any of Aspects 1-6, wherein applying the OCC comprises applying the sub-PRB OCC in a frequency domain such that an allocated subcarrier power is boosted by a factor and some subcarriers are left empty, wherein the sub-PRB OCC is applied within a PRB or across PRBs, or multiplexed UEs are allocated on some subcarriers within the PRB based at least in part on the sub-PRB OCC.

Aspect 8: The method of any of Aspects 1-7, wherein applying the OCC comprises applying the sub-slot OCC in a time domain such that an allocated symbol power is boosted by a factor and some symbols are left empty, wherein the sub-slot OCC is applied within a slot or across slots, or multiplexed UEs are allocated on some symbols within a slot based at least in part on the sub-slot OCC.

Aspect 9: The method of any of Aspects 1-8, wherein the uplink transmission is a data transmission or a reference signal transmission.

Aspect 10: The method of any of Aspects 1-9, wherein the OCC is associated with an orthogonal matrix.

Aspect 11: The method of any of Aspects 1-10, wherein a transport block size (TBS) or a number of information bits is based at least in part on the multiplexing order.

Aspect 12: A method of wireless communication performed by a network node, comprising: transmitting a configuration associated with an orthogonal cover code (OCC), wherein the configuration indicates a multiplexing order, an OCC codeword for multiplexing, and a type of OCC, and the type of OCC is one of: frequency domain OCC (FD-OCC), time domain OCC (TD-OCC), sub physical resource block (sub-PRB) OCC, or sub-slot OCC; and receiving an uplink transmission with an OCC applied to the uplink transmission based at least in part on the configuration.

Aspect 13: The method of Aspect 12, further comprising: receiving capability signaling that indicates whether a user equipment (UE) is capable of supporting multiplexing, wherein a capability for multiplexing is based at least in part on a phase coherence capability associated with the UE, and the configuration is transmitted based at least in part on the capability signaling.

Aspect 14: The method of any of Aspects 12-13, wherein the multiplexing order is associated with a number of user equipments (UEs) multiplexed by OCC, and a set of resources are shared simultaneously by the number of UEs.

Aspect 15: The method of any of Aspects 12-14, wherein the OCC is associated with transport blocks over multiple slots (TBoMS) or a repetition-based transmission, or the OCC is associated with a non-repetition-based transmission.

Aspect 16: The method of any of Aspects 12-15, wherein the FD-OCC is applied across subcarriers in a frequency domain, and the FD-OCC is applied within a PRB or across PRBs.

Aspect 17: The method of any of Aspects 12-16, wherein the TD-OCC is applied across symbols in a time domain, and the TD-OCC is applied within a slot or across slots.

Aspect 18: The method of any of Aspects 12-17, wherein the sub-PRB OCC is applied in a frequency domain such that an allocated subcarrier power is boosted by a factor and some subcarriers are left empty, the sub-PRB OCC is applied within a PRB or across PRBs, or multiplexed UEs are allocated on some sub-carriers within the PRB based at least in part on the sub-PRB OCC.

Aspect 19: The method of any of Aspects 12-18, wherein the sub-slot OCC is applied in a time domain such that an allocated symbol power is boosted by a factor and some symbols are left empty, and sub-slot OCC is applied within a slot or across slots, or multiplexed UEs are allocated on some symbols within a slot based at least in part on the sub-slot OCC.

Aspect 20: The method of any of Aspects 12-19, wherein the uplink transmission is a data transmission or a reference signal transmission.

Aspect 21: The method of any of Aspects 12-20, wherein the OCC is associated with an orthogonal matrix.

Aspect 22: The method of any of Aspects 12-21, wherein a transport block size (TBS) or a number of information bits is based at least in part on the multiplexing order.

Aspect 23: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-11.

Aspect 24: An apparatus for wireless communication at a device, the apparatus comprising one or more memories and one or more processors coupled to the one or more memories, the one or more processors configured to cause the device to perform the method of one or more of Aspects 1-11.

Aspect 25: An apparatus for wireless communication, the apparatus comprising at least one means for performing the method of one or more of Aspects 1-11.

Aspect 26: A non-transitory computer-readable medium storing code for wireless communication, the code comprising instructions executable by one or more processors to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: A device for wireless communication, the device comprising a processing system that includes one or more processors and one or more memories coupled with the one or more processors, the processing system configured to cause the device to perform the method of one or more of Aspects 1-11.

Aspect 29: An apparatus for wireless communication at a device, the apparatus comprising one or more memories and one or more processors coupled to the one or more memories, the one or more processors individually or collectively configured to cause the device to perform the method of one or more of Aspects 1-11.

Aspect 30: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 12-22.

Aspect 31: An apparatus for wireless communication at a device, the apparatus comprising one or more memories and one or more processors coupled to the one or more memories, the one or more processors configured to cause the device to perform the method of one or more of Aspects 12-22.

Aspect 32: An apparatus for wireless communication, the apparatus comprising at least one means for performing the method of one or more of Aspects 12-22.

Aspect 33: A non-transitory computer-readable medium storing code for wireless communication, the code comprising instructions executable by one or more processors to perform the method of one or more of Aspects 12-22.

Aspect 34: A non-transitory computer-readable medium storing a set of instructions for wireless communication, the set of instructions comprising one or more instructions that, when executed by one or more processors of a device, cause the device to perform the method of one or more of Aspects 12-22.

Aspect 35: A device for wireless communication, the device comprising a processing system that includes one or more processors and one or more memories coupled with the one or more processors, the processing system configured to cause the device to perform the method of one or more of Aspects 12-22.

Aspect 36: An apparatus for wireless communication at a device, the apparatus comprising one or more memories and one or more processors coupled to the one or more memories, the one or more processors individually or collectively configured to cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors coupled with the one or more memories and configured to cause the UE to:
receive a configuration associated with an orthogonal cover code (OCC), wherein the configuration indicates a multiplexing order, an OCC codeword for multiplexing, and a type of OCC, the type of OCC being a sub physical resource block (sub-PRB) OCC;
apply, based at least in part on the configuration, the sub-PRB OCC to an uplink transmission in a frequency domain such that an allocated subcarrier power is boosted by a factor and some subcarriers are left empty, wherein the factor is associated with a number of multiplexed UEs; and
transmit the uplink transmission with the sub-PRB OCC applied based at least in part on the configuration.

2. The apparatus of claim 1, wherein the one or more processors are further configured to cause the UE to:
transmit capability signaling that indicates whether the UE is capable of supporting multiplexing, wherein a capability for multiplexing is based at least in part on a phase coherence capability associated with the UE, and the configuration is received based at least in part on the capability signaling.

3. The apparatus of claim 1, wherein the multiplexing order is associated with a number of UEs multiplexed by OCC, and a set of resources are shared simultaneously by the number of UEs.

4. The apparatus of claim 1, wherein the OCC is associated with transport blocks over multiple slots (TBoMS) or a repetition-based transmission, or the OCC is associated with a non-repetition-based transmission.

5. The apparatus of claim 1,
wherein the sub-PRB OCC is applied within a PRB or across PRBs, or multiplexed UEs are allocated on some sub-carriers within the PRB based at least in part on the sub-PRB OCC.

6. The apparatus of claim 1, wherein the uplink transmission is a data transmission or a reference signal transmission.

7. The apparatus of claim 1, wherein the OCC is associated with an orthogonal matrix.

8. The apparatus of claim 1, wherein a transport block size (TBS) or a number of information bits is based at least in part on the multiplexing order.

9. An apparatus for wireless communication at a network node, comprising:
one or more memories; and
one or more processors coupled with the one or more memories and configured to cause the network node to:
transmit a configuration associated with an orthogonal cover code (OCC), wherein the configuration indicates a multiplexing order, an OCC codeword for multiplexing, and a type of OCC, the type of OCC being a sub physical resource block (sub-PRB) OCC; and
receive an uplink transmission with the sub-PRB OCC applied to the uplink transmission in a frequency domain such that an allocated subcarrier power is boosted by a factor and some subcarriers are left empty, wherein the factor is associated with a number of multiplexed UEs, based at least in part on the configuration.

10. The apparatus of claim 9, wherein the one or more processors are further configured to cause the network node to:
receive capability signaling that indicates whether a user equipment (UE) is capable of supporting multiplexing, wherein a capability for multiplexing is based at least in part on a phase coherence capability associated with the UE, and the configuration is transmitted based at least in part on the capability signaling.

11. The apparatus of claim 9, wherein the multiplexing order is associated with a number of user equipments (UEs) multiplexed by OCC, and a set of resources are shared simultaneously by the number of UEs.

12. The apparatus of claim 9, wherein the OCC is associated with transport blocks over multiple slots (TBoMS) or a repetition-based transmission, or the OCC is associated with a non-repetition-based transmission.

13. The apparatus of claim 9, wherein the sub-PRB OCC is applied within a PRB or across PRBs, or multiplexed UEs are allocated on some sub-carriers within the PRB based at least in part on the sub-PRB OCC.

14. The apparatus of claim 9, wherein the uplink transmission is a data transmission or a reference signal transmission.

15. The apparatus of claim 9, wherein the OCC is associated with an orthogonal matrix.

16. The apparatus of claim 9, wherein a transport block size (TBS) or a number of information bits is based at least in part on the multiplexing order.

17. A method of wireless communication performed by a user equipment (UE), comprising:

receiving a configuration associated with an orthogonal cover code (OCC), wherein the configuration indicates a multiplexing order, an OCC codeword for multiplexing, and a type of OCC, the type of OCC being a sub physical resource block (sub-PRB) OCC;

applying, based at least in part on the configuration, the sub-PRB OCC to an uplink transmission in a frequency domain such that an allocated subcarrier power is boosted by a factor and some subcarriers are left empty, wherein the factor is associated with a number of multiplexed UEs; and transmitting the uplink transmission with the sub-PRB OCC applied based at least in part on the configuration.

18. The method of claim 17, further comprising: transmitting capability signaling that indicates whether the UE is capable of supporting multiplexing, wherein a capability for multiplexing is based at least in part on a phase coherence capability associated with the UE, and the configuration is received based at least in part on the capability signaling.

19. The method of claim 17, wherein: the sub-PRB OCC is applied within a PRB or across PRBs, or multiplexed UEs are allocated on some sub-carriers within the PRB based at least in part on the sub-PRB OCC.

20. The method of claim 17, wherein the multiplexing order is associated with a number of UEs multiplexed by OCC, and a set of resources are shared simultaneously by the number of UEs.

21. The method of claim 17, wherein the OCC is associated with transport blocks over multiple slots (TBoMS) or a repetition-based transmission, or the OCC is associated with a non-repetition-based transmission.

22. The method of claim 17, wherein the uplink transmission is a data transmission or a reference signal transmission.

23. The method of claim 17, wherein the OCC is associated with an orthogonal matrix.

24. A method of wireless communication performed by a network node, comprising:

transmitting a configuration associated with an orthogonal cover code (OCC), wherein the configuration indicates a multiplexing order, an OCC codeword for multiplexing, and a type of OCC, the type of OCC being a sub physical resource block (sub-PRB) OCC; and receiving an uplink transmission with the sub-PRB OCC applied to the uplink transmission in a frequency domain such that an allocated subcarrier power is boosted by a factor and some subcarriers are left empty, wherein the factor is associated with a number of multiplexed UEs, based at least in part on the configuration.

25. The method of claim 24, further comprising: receiving capability signaling that indicates whether a user equipment (UE) is capable of supporting multiplexing, wherein a capability for multiplexing is based at least in part on a phase coherence capability associated with the UE, and the configuration is transmitted based at least in part on the capability signaling.

26. The method of claim 24, wherein: the sub-PRB OCC is applied within a PRB or across PRBs, or multiplexed UEs are allocated on some sub-carriers within the PRB based at least in part on the sub-PRB OCC.

27. The method of claim 24, wherein the multiplexing order is associated with a number of UEs multiplexed by OCC, and a set of resources are shared simultaneously by the number of UEs.

28. The method of claim 24, wherein the OCC is associated with transport blocks over multiple slots (TBoMS) or a repetition-based transmission, or the OCC is associated with a non-repetition-based transmission.

29. The method of claim 24, wherein the uplink transmission is a data transmission or a reference signal transmission.

30. The method of claim 24, wherein the OCC is associated with an orthogonal matrix.

* * * * *